United States Patent
Hattori et al.

(10) Patent No.: US 10,938,297 B2
(45) Date of Patent: Mar. 2, 2021

(54) AC-DC CONVERSION DEVICE AND METHOD FOR CONTROLLING SAME BY CONTROLLING THE TIMING OF MULTIPLE SWITCH PORTIONS

(71) Applicant: TOSHIBA MITSUBISHI-ELECTRIC INDUSTRIAL SYSTEMS CORPORATION, Chuo-ku (JP)

(72) Inventors: Keisuke Hattori, Chuo (JP); Teruo Yoshino, Chuo (JP); Tomohisa Okami, Chuo (JP)

(73) Assignee: TOSHIBA MITSUBISHI-ELECTRIC INDUSTRIAL SYSTEMS CORPORATION, Chuo-ku (JP)

( * ) Notice: Subject to any disclaimer, the term of this patent is extended or adjusted under 35 U.S.C. 154(b) by 0 days.

(21) Appl. No.: 16/419,617

(22) Filed: May 22, 2019

(65) Prior Publication Data
US 2019/0273430 A1   Sep. 5, 2019

Related U.S. Application Data

(62) Division of application No. 15/777,958, filed as application No. PCT/JP2016/050401 on Jan. 7, 2016, now Pat. No. 10,404,157.

(51) Int. Cl.
*H02M 1/34* (2007.01)
*H02M 7/155* (2006.01)
(Continued)

(52) U.S. Cl.
CPC ............. *H02M 1/34* (2013.01); *H02M 1/32* (2013.01); *H02M 7/125* (2013.01); *H02M 7/155* (2013.01);
(Continued)

(58) Field of Classification Search
CPC ...... H02M 1/081; H02M 1/34; H02M 1/4233; H02M 5/4585; H02M 7/145;
(Continued)

(56) References Cited

U.S. PATENT DOCUMENTS 3,675,110 A   7/1972 Kelley, Jr.
3,704,408 A   11/1972 Schroeder
(Continued)

FOREIGN PATENT DOCUMENTS

JP   50-94440 A   7/1975
JP   56-53573 A   5/1981
(Continued)

OTHER PUBLICATIONS

Office Action issued in corresponding Japanese Application No. 2017-559996 dated Mar. 18, 2019, 10 pages (with English translation).

(Continued)

*Primary Examiner* — Kyle J Moody
*Assistant Examiner* — Lakaisha Jackson
(74) *Attorney, Agent, or Firm* — Oblon, McClelland, Maier & Neustadt, L.L.P.

(57) ABSTRACT

An AC-DC conversion device that includes a major circuit portion and a control circuit. The major circuit portion includes a converter in which multiple switch portions in a bridge connection include separately-excited switching elements and snubber circuits connected in parallel with the switching elements; and the major circuit portion is connected to an alternating current power supply and a direct current circuit and applies, to the direct current circuit, an alternating current voltage applied from the alternating current power supply by an ON of the multiple switch portions. The control circuit controls the voltage applied to the direct current circuit by controlling the ON timing of the (Continued)

multiple switch portions by inputting a control pulse to each of the multiple switch portions.

17 Claims, 19 Drawing Sheets

(51) Int. Cl.
| | |
|---|---|
| *H02M 7/162* | (2006.01) |
| *H02M 7/19* | (2006.01) |
| *H02M 1/32* | (2007.01) |
| *H02M 7/12* | (2006.01) |
| *H02M 1/08* | (2006.01) |

(52) U.S. Cl.
CPC ......... *H02M 7/162* (2013.01); *H02M 7/1623* (2013.01); *H02M 7/1626* (2013.01); *H02M 7/19* (2013.01); *H02M 1/081* (2013.01); *H02M 2001/348* (2013.01)

(58) Field of Classification Search
CPC ............. H02M 7/1557; H02M 7/1623; H02M 2001/348; H02H 7/125
See application file for complete search history.

(56) References Cited

U.S. PATENT DOCUMENTS

| | | | |
|---|---|---|---|
| 4,328,454 A | 5/1982 | Okuyama et al. | |
| 4,463,415 A | 7/1984 | Vollrath | |
| 4,511,834 A | 4/1985 | Studtmann | |
| 4,511,835 A * | 4/1985 | Studtmann | H02P 25/024 318/700 |
| 4,719,398 A * | 1/1988 | Paice | H02P 1/30 318/778 |
| 6,009,008 A | 12/1999 | Pelly | |
| 6,038,155 A | 3/2000 | Pelly | |
| 7,283,377 B2 | 10/2007 | Klaassen et al. | |
| 8,154,895 B2 * | 4/2012 | Gilmore | H02M 7/1626 363/129 |
| 2003/0048006 A1 | 3/2003 | Shelter et al. | |
| 2013/0162223 A1* | 6/2013 | Scholz | H02M 7/162 320/166 |
| 2014/0153308 A1 | 6/2014 | Hart et al. | |
| 2015/0109837 A1* | 4/2015 | Pan | H02M 7/06 363/126 |

FOREIGN PATENT DOCUMENTS

| | | |
|---|---|---|
| JP | 58-151875 A | 9/1983 |
| JP | 389860 A | 4/1991 |
| JP | 5-122922 A | 5/1993 |
| JP | 9-327179 A | 12/1997 |
| JP | 2003-9536 A | 1/2003 |
| JP | 2012-39791 A | 2/2012 |
| JP | 2014-64405 A | 4/2014 |

OTHER PUBLICATIONS

Partial Extended European Search Report dated Aug. 2, 2019 in European Patent Application No. 16883612.0.
International Search Report dated Apr. 5, 2016 in PCT/JP2016/050401 filed Jan. 7, 2016.

* cited by examiner

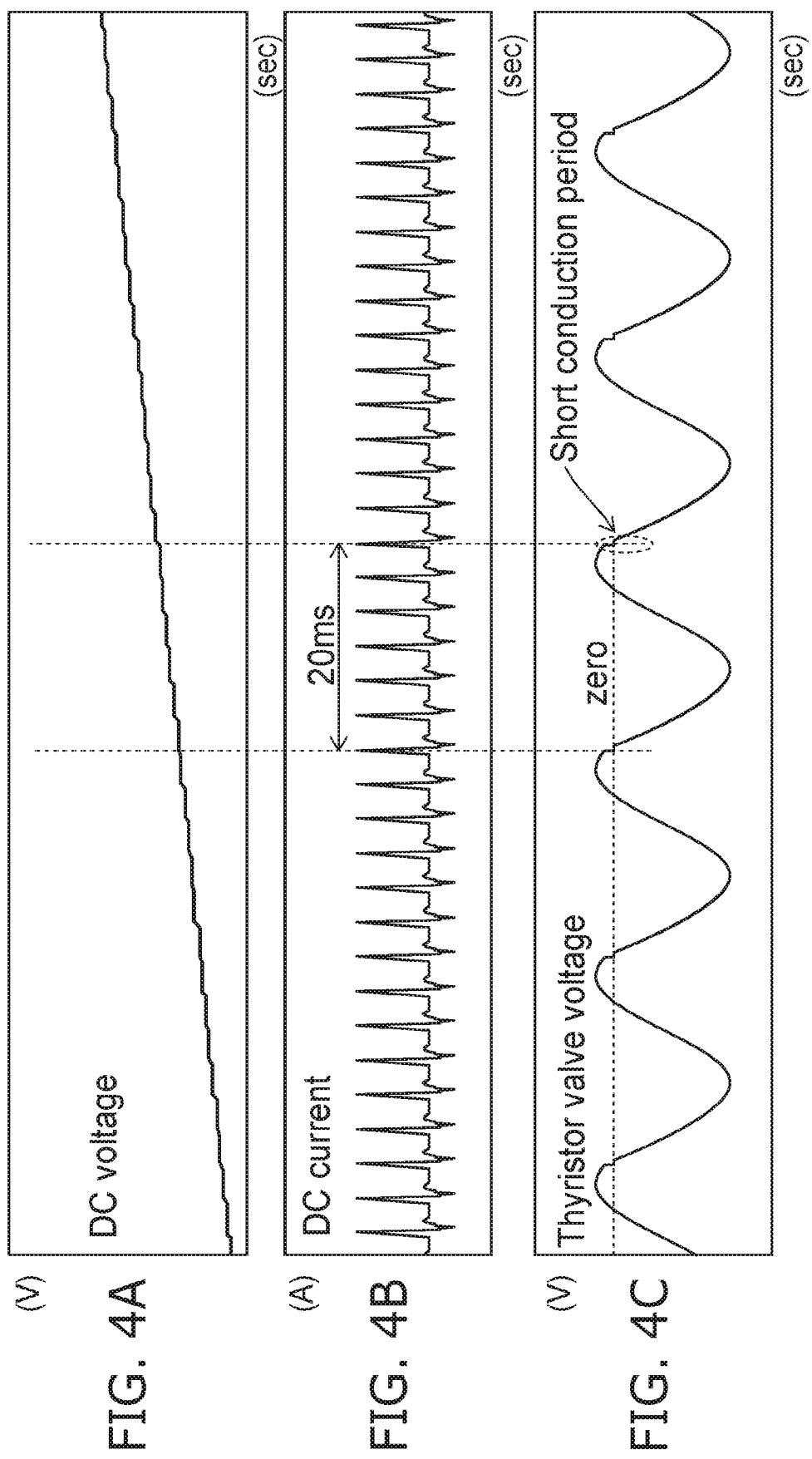

AC-DC CONVERSION DEVICE AND METHOD FOR CONTROLLING SAME BY CONTROLLING THE TIMING OF MULTIPLE SWITCH PORTIONS

CROSS-REFERENCE TO RELATED APPLICATIONS

This is a divisional of U.S. application Ser. No. 15/777,958, filed May 22, 2018, which is a U.S. national stage application of International Application No. PCT/JP2016/050401, filed Jan. 7, 2016. The contents of each of the above-identified documents are herein incorporated by reference.

FIELD

Embodiments described herein relate generally to an AC-DC conversion device and method for controlling same.

BACKGROUND ART

There is an AC-DC conversion device that converts alternating current power into direct current power or direct current power into alternating current power. The AC-DC conversion device includes multiple switch portions (thyristor valves) having a bridge connection and converts the alternating current power into the direct current power or the direct current power into the alternating current power by controlling the ON timing of each of the switch portions. For example, a separately-excited switching element such as a thyristor or the like is included in each of the switch portions. Also, in the AC-DC conversion device, the voltage value and the current value of the direct current power can be controlled by controlling the timing of the triggering of each of the switch portions.

For example, the AC-DC conversion device controls the ON timing of each of the switch portions by AVR control (Automatic Voltage Regulator: constant voltage control) that causes the voltage value of the direct current voltage to be a substantially constant voltage value corresponding to a prescribed voltage command value.

For example, the AC-DC conversion device is used in a direct current power transmission system that performs power transmission by converting alternating current power into direct current power. In the direct current power transmission system, the AC-DC conversion device is connected to a direct current circuit such as a direct current cable, etc., converts the alternating current power of a connected alternating current circuit into direct current power, and supplies the direct current power to the direct current circuit. Or, the AC-DC conversion device converts the direct current power of the connected direct current circuit into alternating current power and supplies the alternating current power to the alternating current circuit.

PRIOR ART DOCUMENTS

Patent Documents

[Patent Document 1]
JP-A 2014-64405 (Kokai)

SUMMARY OF INVENTION

Problem to be Solved by the Invention

In a direct current power transmission system, a so-called open-line test is performed that confirms the breakdown voltage, etc., of the direct current circuit by applying a direct current voltage to the direct current circuit from the AC-DC conversion device in a state in which one end of the direct current circuit is open, by charging a capacitance component including a parasitic capacitance (a capacitance component) included in the direct current circuit, and by increasing the direct current voltage to a prescribed voltage command value. However, in the case where the voltage value of the direct current voltage is increased to the prescribed voltage command value by the AVR control in the open-line test, there are cases where the current flowing in the direct current circuit and the AC-DC conversion device becomes large and a load is undesirably applied to the switch portions of the AC-DC conversion device. Also, even in the case where the charging current is small, an excessive loss occurs in the snubber circuits connected in parallel with the switching elements in the case where the voltage applied when the switch portions are triggered (ON) is excessive.

Therefore, in the AC-DC conversion device, it is desirable to perform a control so that the generation of the excessive current and the like are suppressed, the occurrence of the excessive load in the switch portions and/or the snubber circuits of the AC-DC conversion device is avoided, and the open-line test can be implemented.

Means for Solving the Problem

According to an embodiment of the invention, an AC-DC conversion device that includes a major circuit portion and a control circuit is provided. The major circuit portion includes a converter in which multiple switch portions in a bridge connection include separately-excited switching elements and snubber circuits connected in parallel with the switching elements; and the major circuit portion is connected to an alternating current power supply and a direct current circuit and applies, to the direct current circuit, an alternating current voltage applied from the alternating current power supply by an ON of the multiple switch portions. The control circuit controls the voltage applied to the direct current circuit by controlling the ON timing of the multiple switch portions by inputting a control pulse (a trigger pulse) to each of the multiple switch portions. In addition to the function of operating using a control method of a normal operation, the control circuit includes the function of performing an operation of gradually reducing the control angle of the control pulse input to each of the multiple switch portions in a range between 90° and 180° phase voltage equivalent when performing an open-line test of increasing the direct current voltage of the direct current circuit to the voltage command value by charging a capacitance component including a parasitic capacitance (a capacitance component) included in a power transmission line or the like of the direct current circuit.

Effects of the Invention

According to embodiments of the invention, an AC-DC conversion device and a method for controlling the AC-DC conversion device are provided that can perform a control so that the generation of excessive current and the like are suppressed, the occurrence of an excessive load in the switch portions and/or the snubber circuits of the AC-DC conversion device is avoided, and the open-line test can be implemented.

BRIEF DESCRIPTION OF DRAWINGS

FIG. 4A to FIG. 4C are graphs illustrating an example of the discontinuous conduction state.

DESCRIPTION OF EMBODIMENTS

Figure 1:
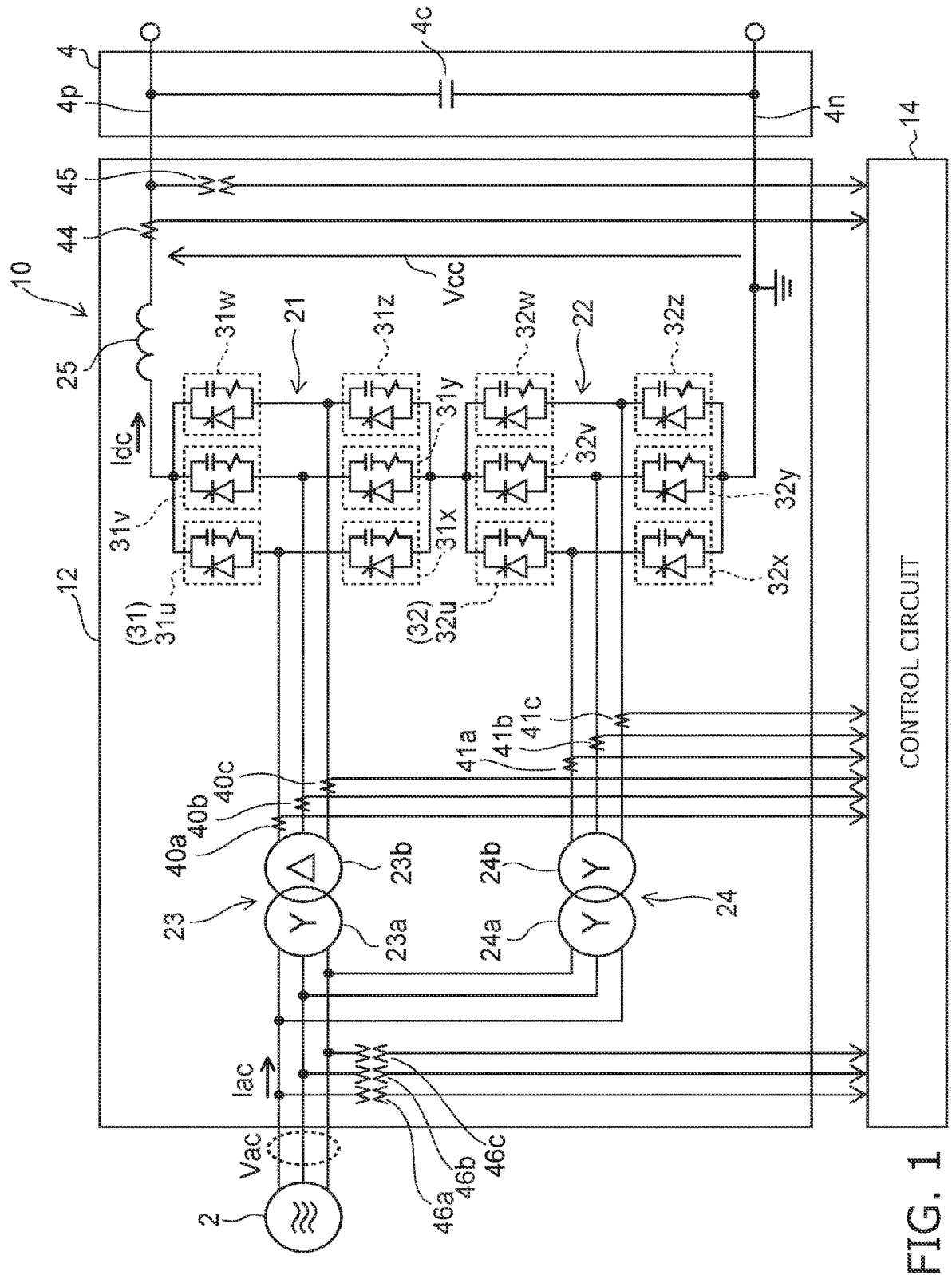
FIG. 1 is a block diagram schematically illustrating an AC-DC conversion device according to a first embodiment.

Various embodiments will be described hereinafter with reference to the accompanying drawings.

The drawings are schematic or conceptual. The relationship between the thickness and the width of each portion, and the size ratio between the portions, for instance, are not necessarily identical to those in reality.

Furthermore, the same portion may be shown with different dimensions or ratios depending on the figures.

In the present specification and the drawings, components similar to those described previously with reference to earlier figures are labeled with like reference numerals, and the detailed description thereof is omitted appropriately.

First Embodiment

FIG. 1 is a block diagram schematically illustrating an AC-DC conversion device according to a first embodiment.

As illustrated in FIG. 1, the AC-DC conversion device 10 includes a major circuit portion 12 and a control circuit 14. The major circuit portion 12 is connected to an alternating current power supply 2 and a direct current circuit 4. The alternating current power supply 2 is, for example, a three-phase alternating current power supply. The alternating current power supply 2 supplies three-phase alternating current power to the AC-DC conversion device 10.

The AC-DC conversion device 10 is a separately-excited conversion device, converts the alternating current power supplied from the alternating current power supply 2 into direct current power, and supplies the direct current power to the direct current circuit 4. The major circuit portion 12 performs the conversion from the alternating current power into the direct current power. The control circuit 14 controls the conversion of the electrical power by the major circuit portion 12.

The direct current circuit 4 includes a positive-side direct current busbar 4p and a negative-side direct current busbar 4n. The negative-side direct current busbar 4n is grounded in the example of FIG. 1. The positive-side direct current busbar 4p is, for example, a direct current cable such as a submarine cable, etc. The negative-side direct current busbar 4n may be a cable return or may be an earth return, a sea return, etc. In other words, the negative-side direct current busbar 4n is provided as necessary and is omissible. The direct current circuit 4 also includes a direct current line capacitance 4c. The direct current line capacitance 4c is, for example, a stray capacitance generated between the positive-side direct current busbar 4p and the negative-side direct current busbar 4n.

For example, the AC-DC conversion device 10 is used in a direct current power transmission system. In the direct current power transmission system, the AC-DC conversion device 10 is connected to one end of the direct current circuit 4; and a conversion device similar to the AC-DC conversion device 10 is connected to the other end of the direct current circuit 4. In the direct current power transmission system, the electrical power is converted from alternating current power into direct current power in the AC-DC conversion device 10; and the electrical power is returned to alternating current power from the direct current power in the conversion device on the opposite side. Thus, in the direct current power transmission system, by converting the alternating current power into direct current power, transmitting the direct current power, and reconverting the direct current power into alternating current power, the alternating current power after the reconversion is supplied to an electric power system, etc.

The major circuit portion 12 includes converters 21 and 22, transformers 23 and 24, and a direct current reactor 25. The converter 21 includes six switch portions 31u, 31v, 31w, 31x, 31y, and 31z having a three-phase bridge connection. Similarly, the converter 22 includes six switch portions 32u, 32v, 32w, 32x, 32y, and 32z having a three-phase bridge connection. Each of the switch portions 31u, 31v, 31w, 31x, 31y, 31z, 32u, 32v, 32w, 32x, 32y, and 32z is, for example, a thyristor valve.

For convenience hereinbelow, the switch portions 31u, 31v, 31w, 31x, 31y, and 31z are called the "switch portions 31" when called collectively. Similarly, the switch portions 32u, 32v, 32w, 32x, 32y, and 32z are called the "switch portions 32" when called collectively.

The transformers 23 and 24 include primary windings 23a and 24a and secondary windings 23b and 24b. The primary windings 23a and 24a of the transformers 23 and 24 are connected to the alternating current power supply 2. The secondary winding 23b of the transformer 23 is connected to the alternating current connection points of the converter 21. The secondary winding 24b of the transformer 24 is connected to the alternating current connection points of the converter 22. Thereby, the alternating current power that is transformed by the transformers 23 and 24 is supplied to the alternating current connection points of the converters 21 and 22.

In the example, the transformers 23 and 24 are three-phase transformers. The primary winding 23a of the transformer 23 has a Y-connection. The secondary winding 23b of the transformer 23 has a Δ-connection. The primary winding 24a of the transformer 24 has a Y-connection. The secondary winding 24b of the transformer 24 has a Y-connection. Accordingly, although the phase of the alternating current voltage supplied to the converter converter 22 is the same phase as the alternating current voltage of the alternating current power supply 2, the phase of the alternating current voltage supplied to the converter 21 is shifted 30° from the phase of the alternating current voltage of the alternating current power supply 2.

The direct current output point on the positive side of the converter 21 is connected to the direct current reactor 25 and is connected to the positive-side direct current busbar 4p of the direct current circuit 4 via the direct current reactor 25. The direct current output point on the positive side of the converter 22 is connected to the direct current output point on the negative side of the converter 21. In other words, the direct current output points of the converters 21 and 22 are connected in series to each other. The direct current output point on the negative side of the converter 22 is connected to the negative-side direct current busbar 4n of the direct current circuit 4.

In other words, in the example, the major circuit portion 12 is a so-called twelve-phase AC-DC conversion circuit. The major circuit portion 12 and the control circuit 14 convert the alternating current power supplied from the alternating current power supply 2 into the direct current power by controlling the ON timing of each of the switch portions 31 and 32. The major circuit portion 12 applies the direct current voltage between the positive-side direct current busbar 4p and the negative-side direct current busbar 4n.

The control circuit 14 controls the conversion from the alternating current power to the direct current power by the major circuit portion 12 by controlling the ON timing of each of the switch portions 31 and 32 by inputting a control pulse to each of the switch portions 31 and 32. The ON timing of each of the switch portions 31 and 32 also is called the control angle. Also, the control circuit 14 controls the voltage value of the direct current voltage applied to the direct current circuit 4 by controlling the control angle of the control pulse (the trigger pulse) input to each of the switch portions 31 and 32.

The major circuit portion 12 is not limited to a twelve-phase AC-DC conversion circuit and may be a six-phase AC-DC conversion circuit. Further, a multi-phase AC-DC conversion circuit such as twenty-four-phase, thirty-six-phase, forty-eight-phase, etc., may be used. Also, the alternating current power of the alternating current power supply 2 may be, for example, single-phase alternating current power. In such a case, the major circuit portion 12 may be a single-phase bridge circuit.

The major circuit portion 12 further includes current sensors 40a, 40b, 40c, 41a, 41b, and 41c, voltage sensors 46a, 46b, and 46c, a current sensor 44, and a voltage sensor 45.

The current sensors 40a, 40b, and 40c sense the alternating current of each phase on the secondary side of the transformer 23 and input the sensed values of the alternating current to the control circuit 14. The current sensors 41a, 41b, and 41c sense the alternating current of each phase on the secondary side of the transformer 24 and input the sensed values of the alternating current to the control circuit 14.

The voltage sensors 46a, 46b, and 46c sense the alternating current voltage of each phase of the alternating current power supply 2 and input the sensed values of the alternating current voltage to the control circuit 14.

The current sensors 40a, 40b, 40c, 41a, 41b, and 41c may sense the alternating current on the primary side of the transformers 23 and 24. For example, current sensors that sense the alternating current on the primary side of the transformers 23 and 24 and current sensors that sense the alternating current on the secondary side both may be provided.

The current sensor 44 senses the direct current output from the converters 21 and 22 and inputs the sensed value of the direct current to the control circuit 14. The voltage sensor 45 senses the direct current voltage output from the converters 21 and 22. In other words, the voltage sensor 45 senses the direct current voltage of the direct current line capacitance 4c. The voltage sensor 45 inputs the sensed value of the direct current voltage to the control circuit 14.

The control circuit 14 controls the ON timing of each of the switch portions 31 and 32 based on the input sensed values of the alternating current, the alternating current voltage, the direct current, and the direct current voltage. For example, in the normal operation mode, the control circuit 14 senses the zero crossing point of the alternating current voltage of the inter-line voltage from the sensed values of the alternating current voltage of the alternating current power supply 2 sensed by the voltage sensors 46a, 46b, and 46c and controls a control angle $\alpha_L$ referenced to the zero crossing point of the inter-line voltage. Because the phases of the switch portions 31 are shifted 30° due to the transformer 23, the control circuit 14 controls the ON timing of the switch portions 31 by considering the shift.

Figure 2:
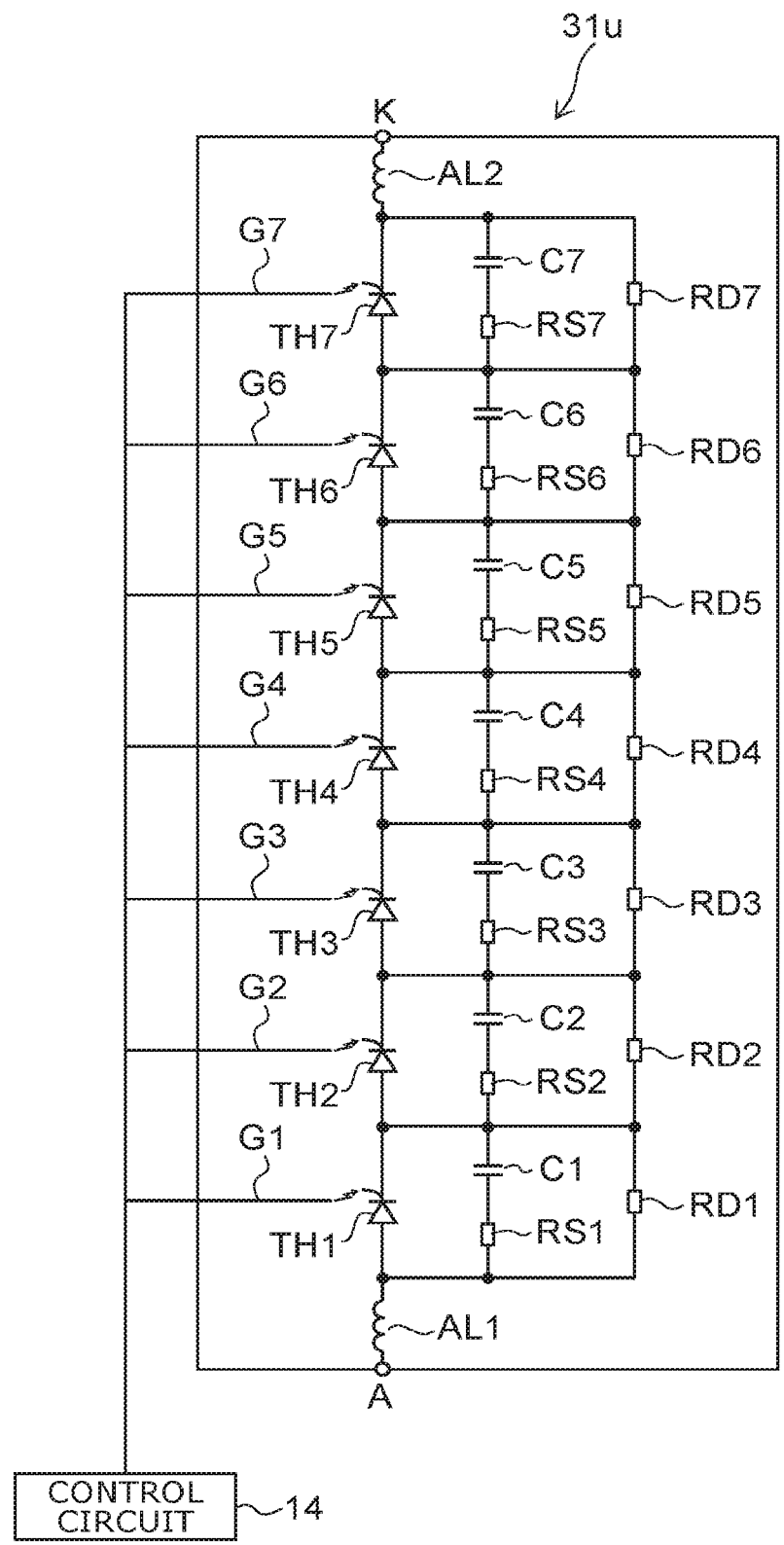
FIG. 2 is a block diagram schematically illustrating the switch portion according to the first embodiment.

FIG. 2 is a block diagram schematically illustrating the switch portion according to the first embodiment.

As illustrated in FIG. 2, the switch portion 31*u* includes multiple thyristors TH1 to TH7, multiple resistors RS1 to RS7, multiple condensers C1 to C7, multiple voltage-dividing resistors RD1 to RD7, and reactors AL1 and AL2. The configurations of the other switch portions 31*v*, 31*w*, 31*x*, 31*y*, 31*z*, 32*u*, 32*v*, 32*w*, 32*x*, 32*y*, and 32*z* are substantially the same as the configuration of the switch portion 31*u*; and a detailed description is therefore omitted.

The thyristors TH1 to TH7 are connected in series. In the example, seven thyristors TH1 to TH7 are connected in series. The number of thyristors may be seven or less or may be eight or more. There may be one thyristor. It is sufficient for the number of thyristors connected in series to be appropriately set according to the applied voltage value, etc.

The reactor AL1 is connected to one end of the thyristors TH1 to TH7 connected in series. The reactor AL2 is connected to the other end of the thyristors TH1 to TH7 connected in series. It is sufficient for the connection points of the reactors AL1 and AL2 to be connected in series with TH1 to TH7 which are connected in series; and this is not limited to the positions of the drawing.

The resistor RS1 is connected in series with the condenser C1. The resistor RS1 and the condenser C1 are connected in parallel with the thyristor TH1. The resistor RS1 and the condenser C1 form a so-called snubber circuit for the thyristor TH1.

Similarly, a snubber circuit that includes the resistor RS2 and the condenser C2 is connected in parallel with the thyristor TH2. A snubber circuit that includes the resistor RS3 and the condenser C3 is connected in parallel with the thyristor TH3. A snubber circuit that includes the resistor RS4 and the condenser C4 is connected in parallel with the thyristor TH4. A snubber circuit that includes the resistor RS5 and the condenser C5 is connected in parallel with the thyristor TH5. A snubber circuit that includes the resistor RS6 and the condenser C6 is connected in parallel with the thyristor TH6. A snubber circuit that includes the resistor RS7 and the condenser C7 is connected in parallel with the thyristor TH7.

The voltage-dividing resistors RD1 to RD7 are respectively connected in parallel with the snubber circuits. For example, the voltage-dividing resistors RD1 to RD7 perform the role of making uniform the direct current voltage distribution of the thyristors TH1 to TH7, are used as voltage distribution components of a not-illustrated sense circuit of the forward voltage and/or the reverse voltage, etc.

The thyristors TH1 to TH7 include gate light guides G1 to G7 (optical fibers). The gate light guides G1 to G7 input optical signals to the gates of the thyristors TH1 to TH7. The thyristors TH1 to TH7 are triggered (turned on) according to the input of the optical signals. In other words, the thyristors TH1 to TH7 are so-called photo-thyristors.

Each of the gate light guides G1 to G7 is connected to the control circuit 14. The control circuit 14 triggers (turns ON) the thyristors TH1 to TH7 by inputting optical signals having pulse forms as the control pulses to the gates of the thyristors TH1 to TH7 via the gate light guides G1 to G7. The control circuit 14 inputs the optical signals having the pulse forms substantially simultaneously to the thyristors TH1 to TH7. The thyristors TH1 to TH7 are triggered substantially simultaneously. Thereby, the switch portion 31*u* is set to the ON state (the conducting state).

Thus, the control circuit 14 controls the ON timing of the switch portion 31*u* by the input of the optical signals. The control circuit 14 controls the conversion from the alternating current power to the direct current power by the major circuit portion 12 by controlling the ON timing of each of the switch portions 31*u*, 31*v*, 31*w*, 31*x*, 31*y*, 31*z*, 32*u*, 32*v*, 32*w*, 32*x*, 32*y*, and 32*z* by generating the optical signals for each of the switch portions 31*u*, 31*v*, 31*w*, 31*x*, 31*y*, 31*z*, 32*u*, 32*v*, 32*w*, 32*x*, 32*y*, and 32*z*.

In the example, photo-thyristors are used as the thyristors TH1 to TH7. The thyristors TH1 to TH7 are not limited to photo-thyristors, and may be thyristors that are triggered by inputting electrical signals to the gates. Also, the switching elements used as the switch portions 31 and 32 are not limited to thyristors and may be other separately-excited switching elements.

The control circuit 14 includes a normal operation mode of controlling the operation of the major circuit portion 12 in the normal operation of the direct current power transmission system, and an open-line test mode of controlling the operation of the major circuit portion 12 in an open-line test in which a direct current voltage is applied to the direct current circuit 4 in the state in which the other end side of the direct current circuit 4 is open. In the direct current power transmission system, for example, the open-line test is performed after the system configuration and before the initial operation, in maintenance, etc.

In the open-line test, the breakdown voltage and the like of the direct current circuit 4 are confirmed by using the AC-DC conversion device 10 used in the direct current power transmission system without separately using a test power supply, etc. Also, in the open-line test, for example, there are also cases where the direct current circuit 4 is connected to the AC-DC conversion device 10 in stages. For example, the breakdown voltage of the direct current circuit 4 is confirmed in stages by gradually increasing the length of the cable connected to the AC-DC conversion device 10. In such a case, the capacitance value of the direct current line capacitance 4*c* changes according to the length of the connected cable, etc. In other words, the charging/discharging time constant of the direct current circuit 4 changes.

Figure 3:
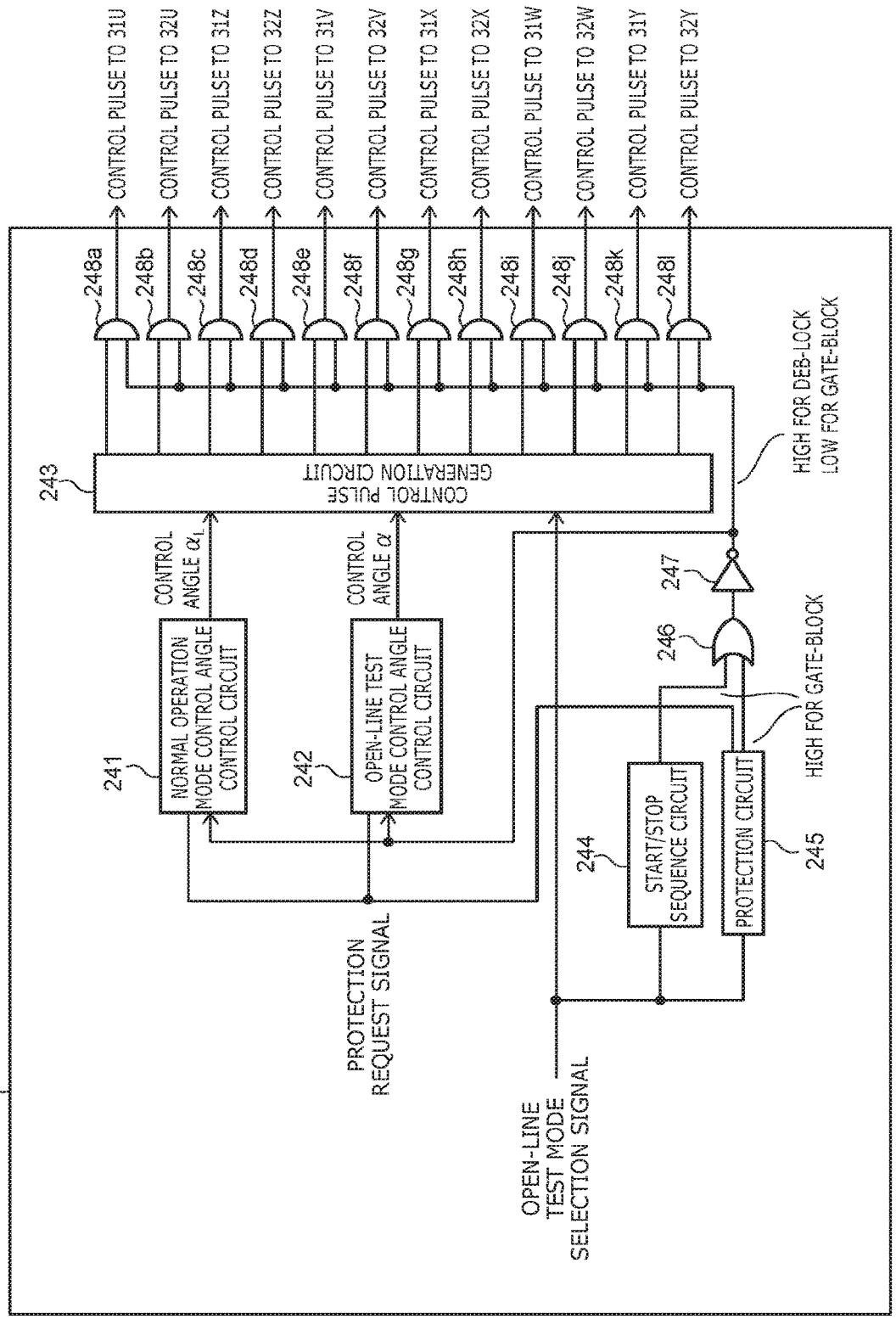
FIG. 3 is a block diagram showing a portion of the control circuit.

FIG. 3 is a block diagram showing a portion of the control circuit 14 shown in FIG. 1.

A normal operation mode control angle control circuit 241 is a circuit that outputs the control angle $\alpha_L$ to a control pulse generation circuit 243 in the normal operation.

An open-line test mode control angle control circuit 242 is a circuit that outputs a control angle $\alpha$ to the control pulse generation circuit 243 in the open-line state.

The control pulse generation circuit 243 is a circuit that outputs the control pulses to the switch portions 31 and 32 via AND circuits 248*a* to 248*l*, a not-illustrated photoelectric converting circuit, etc., based on the control angle $\alpha_L$ which is the output of the normal operation mode control angle control circuit 241 when the open-line test mode selection signal is Low. Also, similarly, the control pulse generation circuit 243 is a circuit that outputs the control pulses to the switch portions 31 and 32 via the AND circuits 248*a* to 248*l*, the not-illustrated photoelectric converting circuit, etc., based on the control angle $\alpha$ which is the output of the open-line test mode control angle control circuit 242 when the open-line test mode selection signal is High. Also, the open-line test mode selection signal may be controlled by a not-illustrated control device from a higher level or by being directly set by the control circuit 14 by an operator. Although not illustrated, the signals of the voltage sensors 46*a*, 46*b*, and 46, the current sensors 40*a*, 40*b*, 40*c*, 41*a*, 41*b*, and 41*c*, the current sensor 44, and the voltage sensor 45 are input to the normal operation mode control angle control circuit 241 and the open-line test mode control angle control circuit 242.

Also, although not illustrated, the outputs of the voltage sensors 46a, 46b, and 46 are input to the control pulse generation circuit 243.

A start/stop sequence circuit 244 operates a start/stop sequence by a direct operation by the control circuit 14 due to a not-illustrated signal or operator from a higher level. Also, although not illustrated, the major circuit condition signals (the states of the circuit breakers, the states of the auxiliary circuits, the states of the alternating current voltage and the direct current voltage of the major circuit and the alternating current and the direct current of the major circuit, etc.) from a higher level are input to the start/stop sequence circuit 244.

At the appropriate timing, the start/stop sequence circuit sets the start/stop GB signal (the start/stop GATE-BLOCK signal) which is the output to be Low when operating and High when stopped. Also, the output is input to an OR circuit 246. A protect GB signal which is the output of a protection circuit 245 is input to one other input of the OR circuit 246. The protection GB signal is LOW normally.

Although not illustrated, the major circuit condition signals (the states of the circuit breakers, the states of the auxiliary circuits, the states of the alternating current voltage and the direct current voltage of the major circuit and the alternating current and the direct current of the major circuit, etc.) from the higher level or the control angle $\alpha_L$ in the normal operation which is the output of the normal operation mode control angle control circuit 241 and/or the control angle $\alpha$ which is the output of the open-line test mode control angle control circuit 242 are input to the protection circuit 245. Or, in the case of the open circuit test mode as described below, the operation of the protection circuit 245 performs a special protection sensing due to the open-line test mode selection signal.

As necessary, when the protection sensing of the protection circuit 245 operates, the protection request signal is output to the normal operation mode control angle control circuit 241 and the open-line test mode control angle control circuit 242; and the control angle $\alpha_L$ and the control angle $\alpha$ which are the outputs of the normal operation mode control angle control circuit 241 and the open-line test mode control angle control circuit 242 are controlled to be the appropriate values.

Also, when the protection sensing of the protection circuit 245 operates, the output signal to the OR circuit 246 is set to High at a timing corresponding to the type of the abnormality. The output of the OR circuit is connected to a NOT gate 247.

The output of the NOT gate 247 is input to the normal operation mode control angle control circuit 241, the open-line test mode control angle control circuit 242, and the AND circuits 248a to 248l.

The integration circuits, etc., inside the circuits of the normal operation mode control angle control circuit 241 and the open-line test mode control angle control circuit 242 are appropriately set to the initial state by the output signal of the NOT gate 247. Also, the AND circuits 248a to 248l no longer output the control pulses the control pulses to the switch portions 31 and 32 in the case where the output signal of the NOT gate 247 is Low.

In the case of the normal operation mode, the normal operation mode control angle control circuit 241 controls the trigger (ON) timing of each of the switch portions by AVR control (Automatic Voltage Regulation: constant voltage control) that controls the voltage between the positive-side direct current busbar 4p and the negative-side direct current busbar 4n of the direct current circuit 4 to be a substantially constant voltage corresponding to the voltage command value or by ACR control (Automatic Current Regulator: constant current control) that sets the current value of the direct current to be a substantially constant current value corresponding to the prescribed current command value.

On the other hand, the case of the open-line test mode, the open-line test mode control angle control circuit 242 performs the control of the control angle of the control pulse input to each of the switch portions 31 and 32 to increase the direct current voltage applied to the direct current circuit at an appropriate change rate by reducing the control angle $\alpha$ at an appropriate change rate in the range between 90° and 180° when referenced to the phase voltage.

In other words, the open-line test mode control angle control circuit 242 performs the control of reducing the control angle $\alpha$ from the operation start point when charging the direct current line capacitance 4c of the direct current circuit 4 to the voltage command value. In the control circuit 14, the alternating current voltages applied to the switch portions 31 and 32 in the open-line test basically correspond to the phase voltages of the alternating current voltages input to the converters 21 and 22. Accordingly, the control angle $\alpha$ that is controlled by the open-line test mode control angle control circuit 242 is the control phase for the phase of the phase voltage. In the case where the value that the control angle $\alpha$ is reduced toward 90° when referenced to the phase voltage is too large for the increase of the direct current voltage of the direct current circuit 4, the voltage that is applied to the two switch portion ends when the switch portion is switched ON becomes large; and a large loss occurs in the snubber circuits of the switch portion. On the other hand, in the case where the value that the control angle $\alpha$ is reduced toward 90° when referenced to the phase voltage is too small for the increase of the direct current voltage of the direct current circuit 4, the voltage that is applied to the two switch portion ends when the switch portion is switched ON becomes small; and there is a possibility that the switch portion can no longer be switched ON correctly. From the description recited above, it is necessary to change the control angle $\alpha$ at an appropriate decrease rate to cause the voltage applied to the two switch portion ends when the switch portion is switched ON to be within the appropriate range. Because the increase rate of the direct current voltage is different according to the magnitude of the direct current line capacitance 4c, the appropriate decrease rate of the control angle $\alpha$ is different according to the length of the connected direct current line even for the same AC-DC conversion system.

The appropriate decrease rate of the control angle $\alpha$ can be determined by digital simulation, etc. For example, it can be determined whether or not the set decrease rate of the control angle $\alpha$ is appropriate by confirming the voltage applied to the two switch portion ends when the switch portion is switched ON from the results of the digital simulation. For example, in one simulation example, in an AC-DC conversion system including a twelve-phase pulse converter when the transformer secondary-side voltage is 205 kV rms and the capacitance of the connected direct current line is 160 uF, in the case where the operation start of the control angle $\alpha$ is performed using 180° as the initial value when referenced to the phase voltage, when a digital simulation is performed to reduce the control angle $\alpha$ from 180° when referenced to the phase voltage at a rate of 1.0 (deg/sec), the voltage applied to the two switch portion ends when the switch portion is switched ON can be confirmed to be about 70 kV which is within the appropriate range;

therefore, at these conditions, 1.0 (deg/sec) can be determined to be an appropriate decrease rate of the control angle α.

For example, the open-line test mode control angle control circuit 242 reduces the control angle α by a constant amount. For example, the open-line test mode control angle control circuit 242 causes the control angle α to monotonously decrease. The width of the decrease of the control angle α may be changed. For example, for the conditions of the charging voltage of the direct current line capacitance 4c being low and a large current flowing, the decrease width of the control angle α may be reduced; and the decrease width of the control angle α may be increased as the charging voltage of the direct current line capacitance 4c increases.

Also, the control angle α may not always be reduced continuously. For example, there may be an interval in which the control angle α does not change. Further, there may be an interval in which the control angle α increases temporarily. For example, the control angle α may be reduced continuously from 180° when referenced to the phase voltage; the control angle α may be increased for only a prescribed interval partway through; subsequently, the control angle α may be reduced again. In the interval of the open-line test in which the direct current line capacitance 4c of the direct current circuit 4 is charged to the voltage command value, it is sufficient for the control angle α to have a tendency of decreasing from 180° toward 90° when referenced to the phase voltage.

In the open-line test, the load of the AC-DC conversion device 10 is the direct current line capacitance 4c of the direct current circuit 4. By setting one switch portion (e.g., only 31u) of the switch portions 31 and 32 to which the control pulse is applied to be ON when applying the control pulse to any of the switch portions 31 and 32 of the major circuit portion 12, the current from the alternating current circuit 2 flows in the direct current circuit 4 via the switch portion in the ON state; and the direct current line capacitance 4c is charged. The switch portion that is in the ON state is in the conducting state until the phase of the alternating current voltage applied by the alternating current circuit 2 advances and a reverse voltage is applied; and the current flows in the direct current circuit 4 for the interval in which any of the switch portions 31 and 32 is in the conducting state. The interval of the conducting state of each of the switch portions 31 and 32 is determined by the relationship between the control angle α and the magnitude of the direct current voltage of the direct current circuit 4; and the current that flows in the direct current circuit 4 is caused to have a pulse form by reducing the control angle α at an appropriate change rate in the range between 90° and 180° when referenced to the phase voltage. Thus, the AC-DC conversion device 10 generates a series of pulse currents. This operating state is called a discontinuous conduction state.

In the normal operation, multiple phases of the switch portions 31 and 32 are constantly in the conducting state. For example, when the switch portion 31u is switched ON and is in the conducting state, the switch portion 31y also is in the conducting state. On the other hand, in the discontinuous conduction mode, among the switch portions 31 and 32, only one phase of the switch portions 31 and 32 is in the conducting state in only the interval in which the pulse current is flowing in the direct current circuit 4; and in the other intervals, all of the switch portions 31 and 32 are in the nonconducting state. Therefore, for example, even when the switch portion 31u is switched ON and is in the conducting state, all of the phases of the switch portions 31 and 32 other than 31u are in the nonconducting state.

The voltage of the direct current line capacitance 4c is discharged via a discharge resistance in the rest interval of the pulse current. The discharge resistance is, for example, the equivalent leak resistance of the direct current circuit 4, the equivalent leak resistance of the switch portions, the voltage-dividing resistors RD1 to RD7, etc.

FIG. 4A to FIG. 4C are graphs illustrating an example of the discontinuous conduction state in the case of a six-pulse converter. The six-pulse converter corresponds to the case where the major circuit portion 12 is configured using a circuit having one of the three-phase bridge connections of FIG. 1.

In FIG. 4A to FIG. 4C, the horizontal axis is time (seconds).

The vertical axis of FIG. 4A is the direct current voltage (V) applied to the direct current circuit 4.

The vertical axis of FIG. 4B is the direct current (A) flowing in the direct current circuit 4.

The vertical axis of FIG. 4C is the alternating current voltage (V) applied to the switch portion 31u.

To simplify the description, the case of a six-pulse converter including only the converter 21 will now be described as an example.

As illustrated in FIG. 4C, the voltage of each switch portion 31 has a waveform in which a direct current voltage Vdc and the phase voltage are superimposed. The voltage of each switch portion 31 becomes substantially zero for a short length of time at the timing when the control pulse is input. Each switch portion 31 conducts only in this interval. This interval is shorter than the conduction interval of the 120° conduction of the normal operation mode in which the commutation operation is performed between phases. At the timing of applying the trigger pulse to the switch portion 31u in the normal operation mode, the switch portion 31y is in the conducting state; and the current that flows through the switch portion 31u from the transformer 23 passes through TH1 to TH7 included in the switch portion 31y and returns to the transformer 23.

However, in the open-line test mode, the switch portion 31y is in the nonconducting state at the timing of applying the trigger pulse to the switch portion 31u. Also, in the open-line test mode, the switch portion 31x and the switch portion 31z also are in the nonconducting state at the timing of applying the trigger pulse to the switch portion 31u. Accordingly, the current that flows through the switch portion 31u from the transformer 23 returns to the transformer 23 through a path that charges the snubber circuits of the switch portion 31y and the snubber circuits of the switch portion 31z.

As illustrated in FIG. 4B, the direct current waveform includes a series of pulse currents generated when each switch portion 31 conducts for a short length of time. Because the converter 21 has six arms, a pulse current flows six times in one cycle of the alternating current voltage. The direct current line capacitance 4c of the direct current circuit 4 is charged by the pulse current. In the interval in which the pulse current is flowing, the direct current line capacitance 4c is connected to one phase of the converter 21 and therefore is charged to the value of the phase voltage of the one phase. For example, the condensers C1 to C7 of the snubber circuits also are included in the direct current line capacitance 4c. Accordingly, the direct current voltage can be generated even in the case where there is no direct current circuit 4 and there is only the major circuit portion 12.

As illustrated in FIG. 4A, each time the pulse current flows in the direct current line capacitance 4c of the direct current circuit 4, the direct current line capacitance 4c is charged; and the direct current voltage Vdc increases.

The charging voltage of the direct current line capacitance 4c can be calculated from a value Vph of the phase voltage when the switch portion 31 conducts. The control angle α of the switch portion 31 is referenced to the phase voltage and has the relationship of α=α_L+30° with the control angle α_L which is referenced to the inter-line voltage of the normal operation mode.

Because the phase of the phase voltage when the switch portion 31 conducts the pulse current is represented by a, the phase voltage at that time can be calculated using the following Formula (1). Here, $V_L$ is the inter-line voltage effective value on the secondary side of the transformers 23 and 24. Here, a is the range of 90° to 180° when referenced to the phase voltage.

[Formula 1]

$$V_{ph} = \frac{\sqrt{2}}{\sqrt{3}} V_L \sin\alpha \tag{1}$$

Further, because two switch portions 31 such as, for example, the switch portions 31u and 31x are connected to one alternating current phase, a voltage $V_{d0}$ that the converter 21 outputs to the direct current circuit 4 is 2 times Formula (1) as illustrated in the following Formula (2).

[Formula 2]

$$V_{do} = 2\frac{\sqrt{2}}{\sqrt{3}} V_L \sin\alpha \tag{2}$$

Accordingly, the direct current line capacitance 4c can be charged by setting the voltage $V_{d0}$ output to the direct current circuit 4 by the converter 21 to be a value that is larger than the direct current voltage $V_{dc}$ of the direct current circuit 4 by adjusting the control angle α.

When the control angle α is 180° or more when referenced to the phase voltage, a forward voltage is not applied to the switch portion that receives the control pulse, and the switch portions cannot be ON; therefore, the voltage that is output to the direct current circuit 4 by the converter 21 is 0 V. Also, a maximum value $V_{max}$ of the voltage that can be output to the direct current circuit 4 by the converter 21 in the open-line test is for the operation at α=90°. The value of the maximum value $V_{max}$ can be represented by the following Formula (3).

[Formula 3]

$$V_{max} = 2\frac{\sqrt{2}}{\sqrt{3}} V_L \tag{3}$$

In the interval in which the pulse current is not flowing, the direct current voltage Vdc decreases according to the discharge resistance that includes the equivalent leak resistance of the switch portions and/or the voltage-dividing resistors RD1 to RD7, and a discharging time constant t of the direct current circuit 4 determined by the direct current line capacitance 4c. Therefore, the maximum value of the direct current voltage Vdc is slightly smaller than the maximum value $V_{max}$ of the voltage that can be output to the direct current circuit 4 by the converter 21 of Formula (3).

Figure 5A:
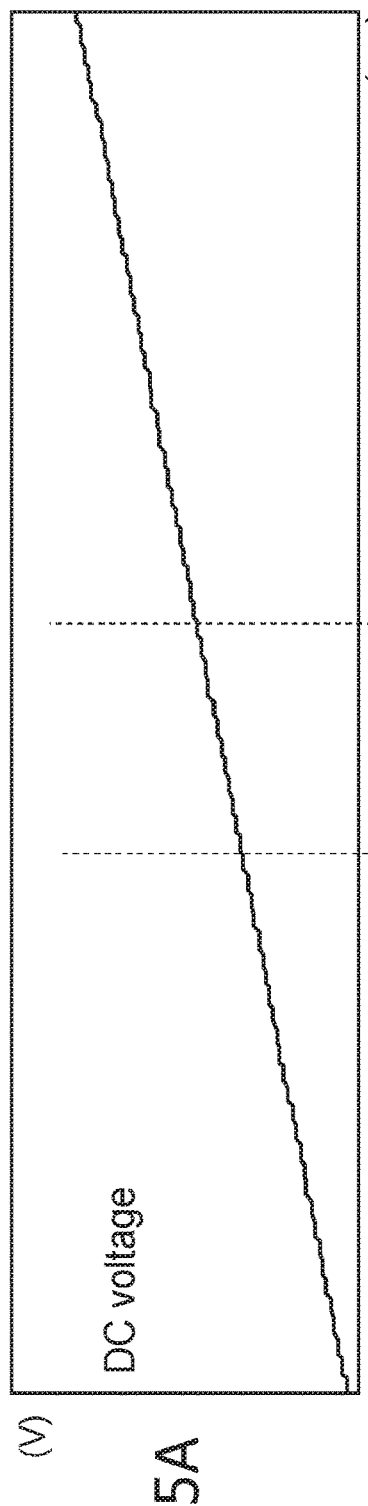
FIG. 5A to FIG. 5C are graphs illustrating another example of the discontinuous conduction state.
Figure 5B:
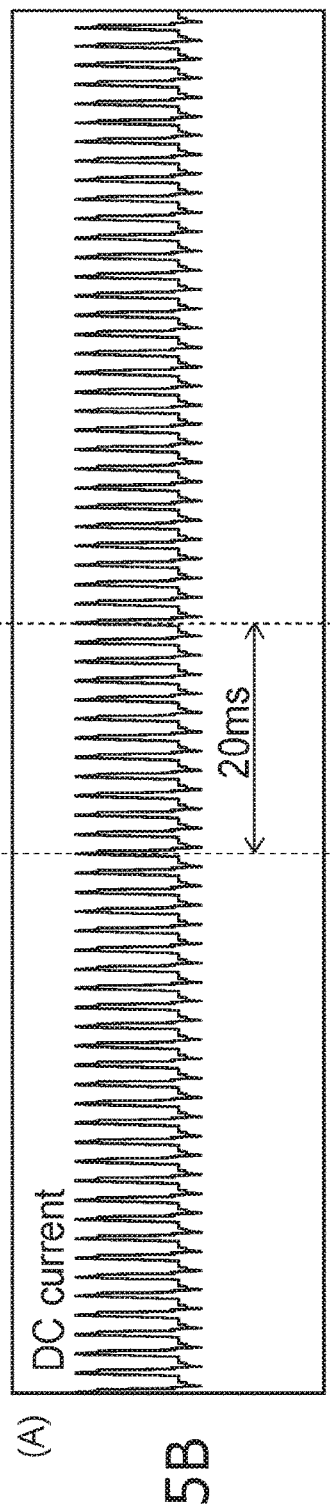
Figure 5C:
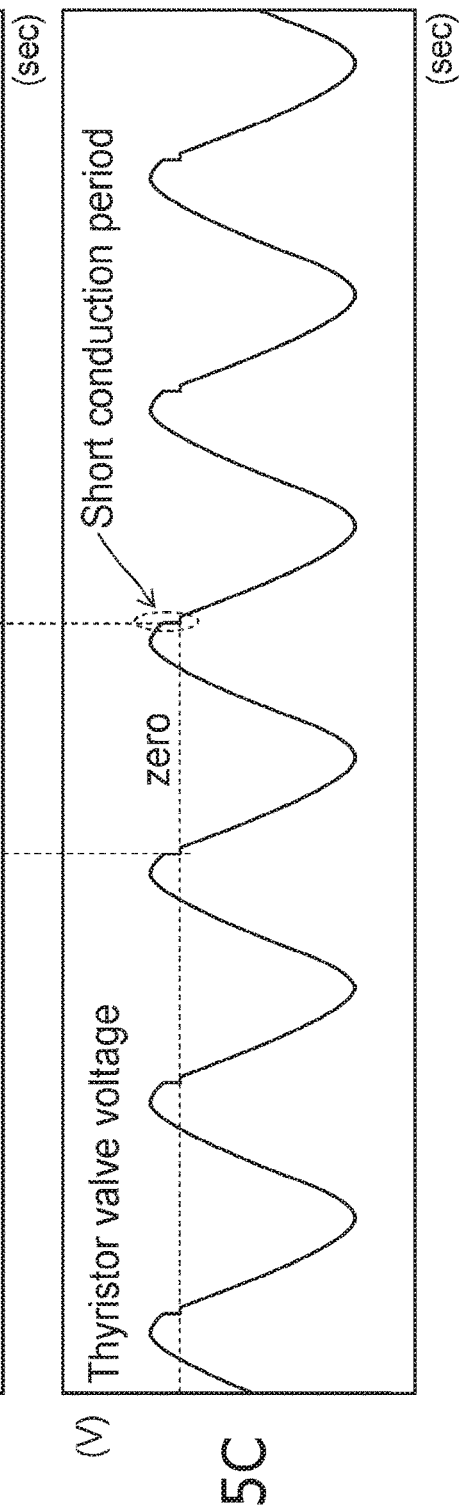

FIG. 5A to FIG. 5C are graphs illustrating another example of the discontinuous conduction state.

FIG. 5A to FIG. 5C illustrate an example of the discontinuous conduction state of a twelve-pulse converter. The horizontal axes and the vertical axes of FIG. 5A to FIG. 5C are substantially the same as the horizontal axes and the vertical axes of FIG. 4A to FIG. 4C.

Although the six-pulse converter is described to simplify the description recited above, the operation in the open-line test is possible similarly for the twelve-pulse converter as well. In the twelve-pulse converter as illustrated in FIG. 5A to FIG. 5C, unlike the six-pulse converter, the direct current that has the pulse form flows twelve times in one cycle.

$V_{d0}$ and $V_{max}$ represented by Formula (2) and Formula (3) for the six-pulse converter are represented respectively by Formula (4) and Formula (5) in the case of the twelve-pulse converter.

[Formula 4]

$$V_{do} = 4\frac{\sqrt{2}}{\sqrt{3}} V_L \sin\alpha \tag{4}$$

[Formula 5]

$$V_{max} = 4\frac{\sqrt{2}}{\sqrt{3}} V_L \tag{5}$$

Here, α is the range of 90° to 180° when referenced to the phase voltage.

For example, in the case where the AVR control is performed in the open-line test, there is a possibility that the converters 21 and 22 may apply a high voltage to the direct current circuit 4 in the state in which the charging voltage of the direct current line capacitance 4c is low; and an excessive current may undesirably flow in the major circuit portion 12 and the direct current circuit 4. For example, such an excessive current undesirably may cause failure of the major circuit portion 12 and/or the direct current circuit 4, etc. Also, in the case where the converters 21 and 22 apply the high voltage to the direct current circuit 4 in the state in which the charging voltage of the direct current line capacitance 4c is low, the anode-cathode voltage when each of the switch portions 31 and 32 is triggered (ON) may become high; and a large loss may undesirably occur in the snubber circuits.

Conversely, in the AC-DC conversion device 10 according to the embodiment, in the open-line test mode for performing the open-line test, the open-line test mode control angle control circuit 242 sets the converter 21 and the converter 22 to the discontinuous conduction state by reducing the control angle α with respect to the phase voltage of the control pulse input to each of the switch portions 31 and 32 from 180° toward 90° and by applying the control pulse (the gate pulse) to only one of the switch portions 31u, 31v, 31w, 31x, 31y, or 31z or the switch portions 32u, 32v, 32w, 32x, 32y, or 32z at one timing. In other words, the open-line test mode control angle control circuit 242 gradually increases the direct current voltage from the minimum value toward the maximum value. Thereby, in the open-line test, the generation of excessive current can be suppressed. Further, the increase of the loss of the snubber circuit, etc., also can be suppressed. For example, the capacitance of the snubber circuit can be suppressed.

The control angle α at the test start is not limited to 180° when referenced to the phase voltage and may be any value that can suppress the generation of excessive current. The control angle α at the test end is not limited to 90° when referenced to the phase voltage and may be any value corresponding to the necessary direct current voltage value. It is sufficient for the control angle α to decrease from the 180° vicinity toward 90° when referenced to the phase voltage. For example, it is sufficient for the control angle α to decrease from about 170° toward 90° when referenced to the phase voltage. The range of the fluctuation of the control angle α may be any range between 90° and 180° when referenced to the phase voltage.

Figure 6:
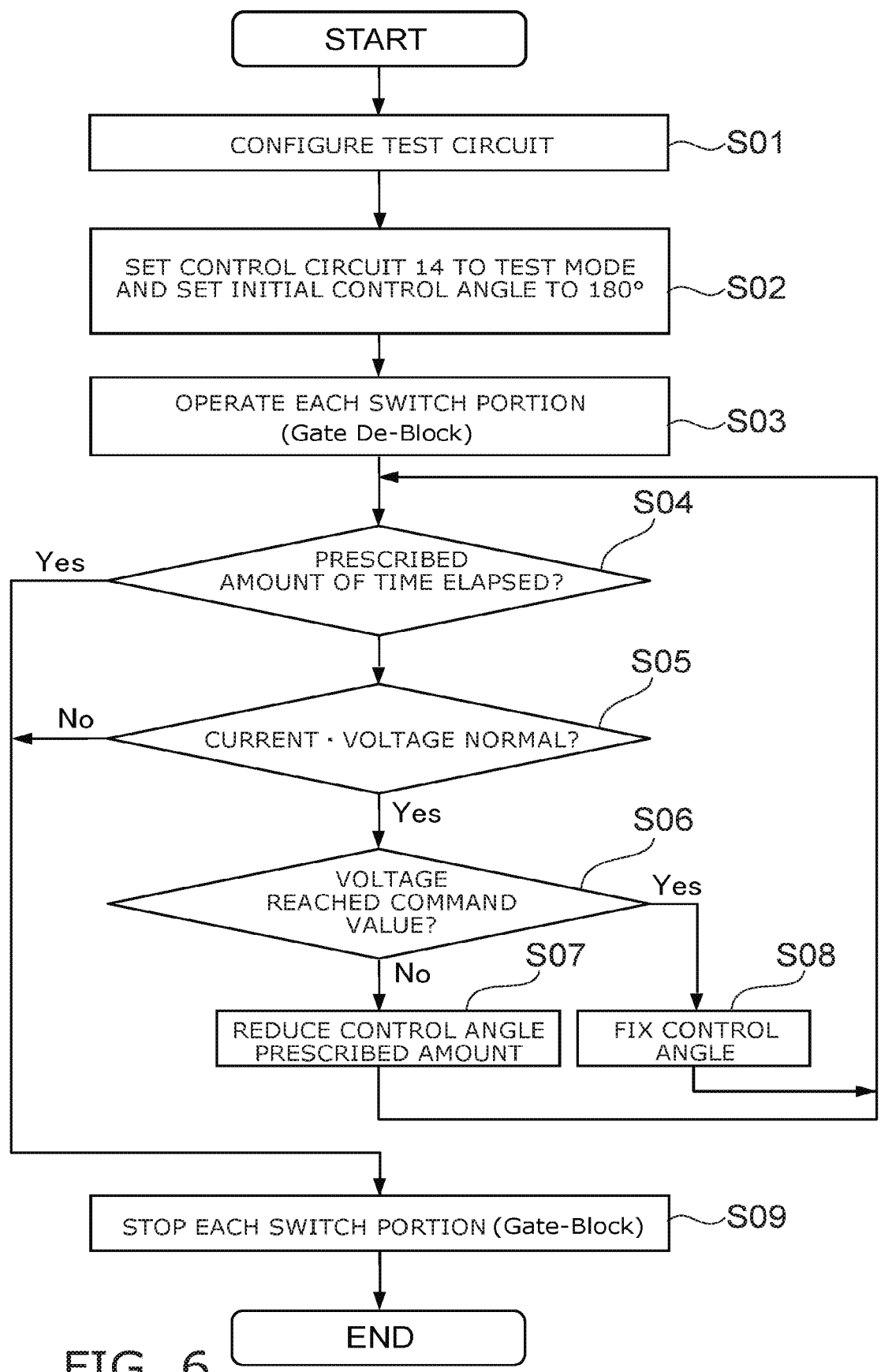
FIG. 6 is a flowchart schematically illustrating an example of operations of the AC-DC conversion device according to the first embodiment.

FIG. 6 is a flowchart schematically illustrating an example of operations of the AC-DC conversion device according to the first embodiment.

As illustrated in FIG. 6, in the case where the open-line test is performed by the AC-DC conversion device 10, first, the test circuit is configured as illustrated in FIG. 1 by connecting the AC-DC conversion device 10 to the alternating current power supply 2 and the direct current circuit 4 (step S01 of FIG. 6).

After configuring the test circuit, the control circuit 14 is set to the open-line test mode. Further, in the open-line test mode, the open-line test mode control angle control circuit 242 sets the control angle α with respect to the phase voltage of the control pulse input to each of the switch portions 31 and 32 at the operation start point of the open-line test to 180° (step S02 of FIG. 6). The control angle α at the test start is not limited to 180° when referenced to the phase voltage, and may be any value at which the excessive current is not generated as described above. Also, the control angle (the initial value) at the operation start point may be set automatically by setting the control circuit 14 to the open-line test mode.

After setting the control angle α to 180°, the open-line test mode control angle control circuit 242 operates (De-Blocks) each of the switch portions 31 and 32 based on the set control angle α (step S03 of FIG. 6). In other words, after setting the control angle α, the control circuit 14 starts the voltage application to the direct current circuit 4 by each of the converters 21 and 22.

In the open-line test, the voltage application to the direct current circuit 4 is continued for at least a prescribed amount of time to confirm the breakdown voltage performance of the direct current circuit 4 (step S04 of FIG. 6). For example, in the case where the prescribed amount of time is 30 minutes, the application to the direct current circuit 4 of the voltage from the converters 21 and 22 to the direct current circuit 4 is continued for 30 minutes. When the prescribed amount of time has elapsed, the operations of the switch portions 31 and 32 are stopped (Gate-Block); and the open-line test is ended (step S09 of FIG. 6).

After starting the operation of each of the switch portions 31 and 32, the control circuit 14 determines whether or not the alternating current, the alternating current voltage, the direct current, and the direct current voltage are normal based on the sensed values of the current sensors 40a, 40b, 40c, 41a, 41b, and 41c, the voltage sensors 46a, 46b, and 46c, the current sensor 44, and the voltage sensor 45 (step S05 of FIG. 6).

For example, the control circuit 14 determines the state to be normal in the case where each of the sensed values is within the appropriate range, and determines the state to be abnormal in the case where one of the sensed values is outside the appropriate range. For example, in the case where the sensed value of the direct current is larger than the appropriate range, the control circuit 14 determines that an insulation defect has occurred in the direct current circuit 4.

In the case of the abnormal determination, the control circuit 14 stops the operations of the switch portions 31 and 32. In other words, the control circuit 14 stops the output of the direct current voltage and halts the open-line test.

On the other hand, in the case of the normal determination, the control circuit 14 determines whether or not the direct current voltage has reached the voltage command value based on the sensed value of the voltage sensor 45 (step S06 of FIG. 6).

In the case where it is determined that the direct current voltage has not reached the voltage command value, the control circuit 14 reduces the control angle α a prescribed amount (step S07 of FIG. 6). After reducing the control angle α, the control circuit 14 returns to step S04 and operates each of the switch portions 31 and 32 based on the control angle α after the reduction. In other words, the control circuit 14 increases the direct current voltage applied to the direct current circuit 4 by a prescribed amount. Thereafter, the control circuit 14 repeats the processing of step S04 to step S07 until the direct current voltage reaches the voltage command value.

In the case where it is determined in step S06 that the direct current voltage has reached the voltage command value, for example, the control circuit 14 holds the control angle α at the value at which the voltage command value was reached (step S08 of FIG. 6). After the direct current voltage reaches the voltage command value, the switch portions 31 and 32 are operated a prescribed amount of time at the held control angle α. In the case where this state has continued the prescribed amount of time, the control circuit 14 determines that the breakdown voltage and the like of the direct current circuit 4 are normal, stops the operations of the switch portions 31 and 32, and ends the open-line test.

Thus, by setting the control angle α to the 180° vicinity and by gradually causing the control angle α to approach 90°, the direct current voltage gradually approaches the voltage command value from the state of being sufficiently small. Thereby, the generation of excessive current and/or the increase of the snubber loss can be suppressed.

Second Embodiment

Figure 7:
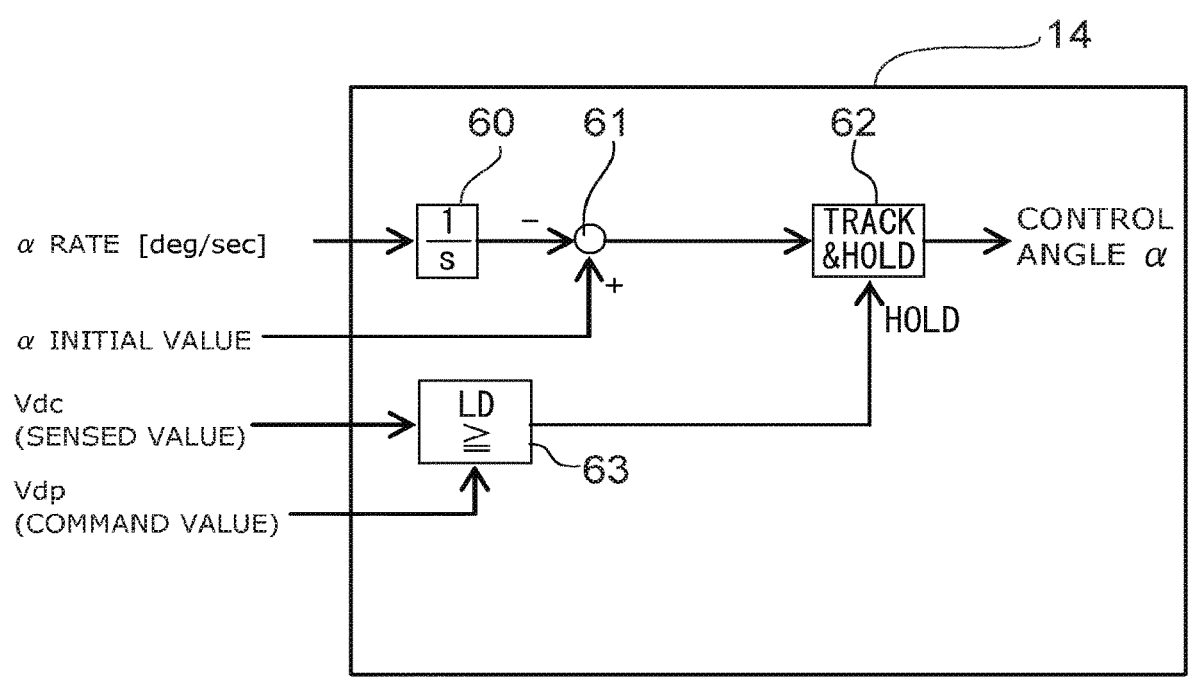
FIG. 7 is a block diagram schematically illustrating a portion of a control circuit of an AC-DC conversion device according to a second embodiment.

FIG. 7 is a block diagram schematically illustrating a portion of a control circuit of an AC-DC conversion device according to a second embodiment.

FIG. 7 schematically illustrates an example of a block diagram of the portion of the open-line test mode control angle control circuit 242 determining the control angle α in the open-line test mode. Components that are substantially the same functionally and configurationally as the first embodiment recited above are marked with the same reference numerals; and a detailed description is omitted.

As illustrated in FIG. 7, the open-line test mode control angle control circuit 242 includes an integrator 60, a subtractor 61, a track-and-hold circuit 62, and a level sense circuit 63. The a rate (deg/sec) which is the decrease rate (the reduction amount) of the control angle α is input to the integrator 60. For example, the integrator 60 integrates the rate every sampling period of the operator inside the open-line test mode control angle control circuit 242. In other words, the output of the integrator 60 increases every sampling period of the operator inside the open-line test mode control angle control circuit 242. For example, in the case where the sampling period of the operator inside the open-line test mode control angle control circuit 242 is 1 ms, the integrator 60 integrates the rate every 1 ms. The integrator 60 inputs the integration result of the rate to the subtractor 61. The output of the integrator 60 is zero before De-Block, zero before De-Block, and gradually increases after De-Block; therefore, the integrator 60 is configured to use a not-illustrated reset signal so that the reset signal is input and the integrator 60 is in a reset state before De-Block; and after De-Block, the reset signal no longer exists and the integrator 60 starts the integration.

The integration result of the rate is input to the subtractor 61; and the initial value of the control angle α is input to the subtractor 61. The control angle α is the control angle at the operation start of the open-line test mode.

As described above, the initial value of the control angle α is set to the 180° vicinity when referenced to the phase voltage. The subtractor 61 subtracts the integration result of the rate from the initial value of the control angle α. Thereby, the control angle α can be caused to approach 90° from the 180° vicinity every input timing of the control pulse. The subtractor 61 inputs the subtraction result to the track-and-hold circuit 62.

The sensed value Vdc of the direct current voltage of the direct current circuit 4 sensed by the voltage sensor 45 and a voltage command value Vdp of the direct current voltage are input to the level sense circuit 63. The level sense circuit 63 senses whether or not the sensed value Vdc of the direct current voltage is the voltage command value Vdp or more. In the case where the sensed value Vdc is the voltage command value Vdp or more, the level sense circuit 63 inputs a hold signal to the track-and-hold circuit 62.

In the case where the hold signal is not input to the track-and-hold circuit 62, the subtraction result of the subtractor 61 is output as the control angle α. In the case where the hold signal is input, the track-and-hold circuit 62 holds the control angle α at this point in time and continues to output the held control angle α. By using the control pulse control circuit 243, etc., the open-line test mode control angle control circuit 242 outputs the control pulse to each of the switch portions 31 and 31 based on the control angle α which is the output of the track-and-hold circuit 62 and the outputs of the voltage sensors 46a, 46b, and 46c. Thereby, the direct current voltage can be set to a value corresponding to the voltage command value Vdp.

In the control method of the first embodiment recited above, according to the decrease rate of the control angle α, there is a possibility that the voltage applied to each of the switch portions 31 and 32 (the anode-cathode voltage of the thyristor valve) when triggered (ON) may become high; and the loss occurring in the snubber circuits may become excessive. Hereinbelow, the anode-cathode voltage is called the "A-K voltage" for convenience.

Figure 8A:
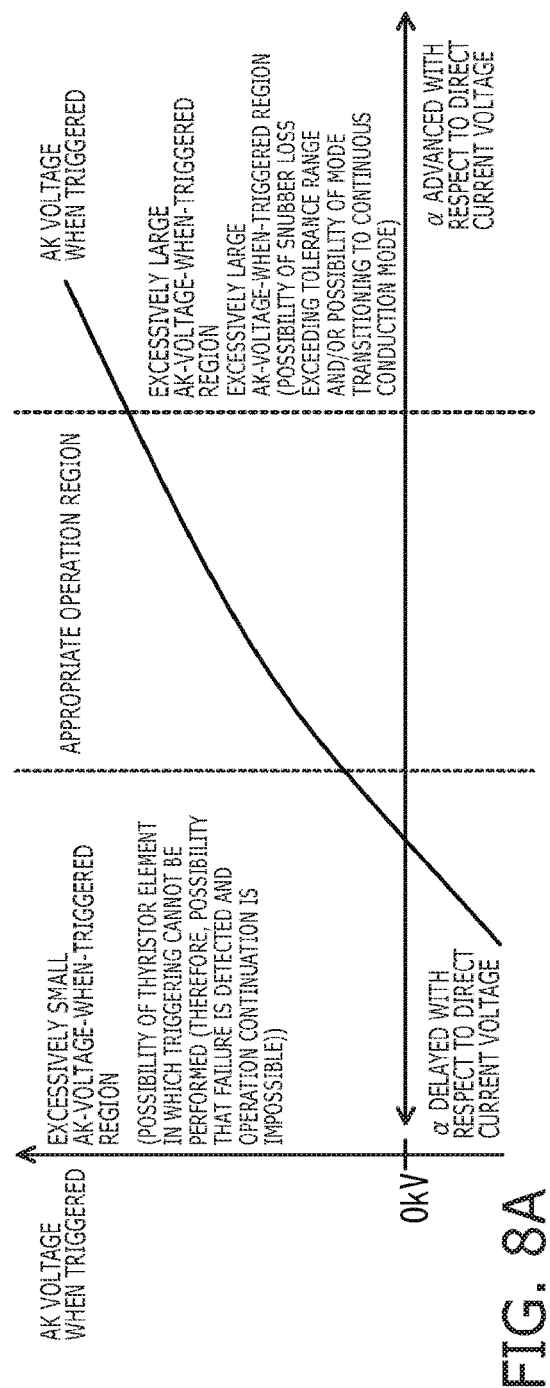
FIG. 8A and FIG. 8B are conceptual views schematically illustrating the operation region in the open-line test.
Figure 8B:
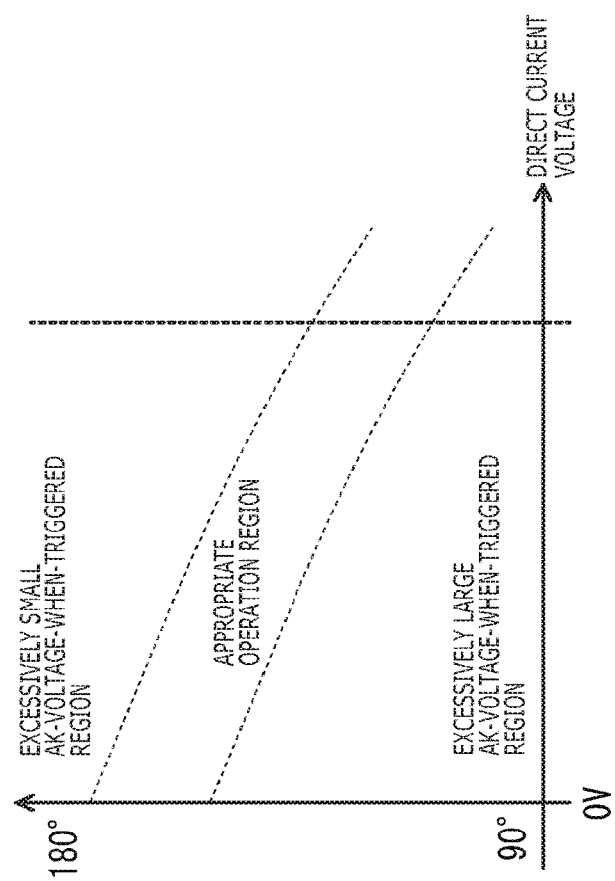

FIG. 8A and FIG. 8B are conceptual views schematically illustrating the operation region in the open-line test.

As illustrated in FIG. 8A and FIG. 8B, the voltage that is applied to each of the switch portions 31 and 32 when triggered (ON) increases when the control angle α is relatively too advanced with respect to the charge rate (the increase rate) of the direct current voltage.

There is a possibility that problems such as the following may occur when the control angle α is too advanced (in the direction of 90°) with respect to the direct current voltage.

(1) The A-K voltage when the switch portion is triggered (ON) becomes excessive, and the snubber loss exceeds the tolerance range.

(2) The operating state switches from the discontinuous conduction state (the state in which a current does not flow continuously in the direct current circuit) to the continuous conduction state; and the charging current becomes excessive (the snubber loss also becomes excessive).

Also, when the control angle α is too delayed with respect to the direct current voltage, there is a possibility that phenomena such as the following may occur.

(1) The A-K voltage when the switch portion is triggered (ON) becomes excessively small; and a switching element that cannot be triggered (ON) occurs due to the fluctuation of the voltage distribution of the switching element of the switch portion. In some cases, the case also may be considered where the forward voltage (the Forward Voltage) necessary for triggering the switching element is not applied to the switching elements and all of the switching elements cannot be triggered (ON). Also, there are also cases where failure may be detected because one of the switching elements cannot be triggered (ON); and the operation undesirably can no longer be continued.

Accordingly, it is necessary to control the control angle α to be an appropriate value matching the charge rate of the direct current voltage and perform a control so that the A-K voltage when the thyristor is triggered (ON) does not become excessively large; and it is favorable to perform a control so that the A-K voltage when the thyristor is triggered (ON) also does not become excessively small.

In the open-line test mode control angle control circuit 242 according to the embodiment, the control angle α advances at a rate matching the increase rate of the direct current voltage. For example, the increase rate of the direct current voltage is estimated from the capacitance of the direct current line capacitance 4c, the inductance component of the direct current reactor 25, etc.; and the rate of the control angle α when charging is determined so that the rate at which the control angle α advances does not exceed the increase rate of the direct current voltage. For example, the open-line test mode control angle control circuit 242 reduces the control angle α so that the increase speed (the increase rate) of the voltage applied to the direct current circuit 4 by the converters 21 and 22 is slower than the increase speed (the increase rate) of the direct current voltage of the direct current line capacitance 4c.

For example, the setting value of the rate of the control angle α can be determined by performing a digital simulation beforehand and confirming the increase rate of the direct current voltage. For example, the rate of the control angle α is set to the value at which it is confirmed from the digital simulation results beforehand that a voltage $V_{d0}$ applied to the direct current circuit by the converters 21 and 22 is constantly 50 kV or less with respect to the direct current voltage Vdc of the direct current circuit 4. Thereby, the control angle α can be advanced gradually to match the increase of the direct current voltage. The charging can be performed in the "appropriate operation region" shown in FIG. 8A and FIG. 8B. The increase of the snubber loss of the direct current voltage charging interval can be suppressed.

For example, multiple rates having different values may be prepared; and the rate may be selected to cause the converter to operate inside the "appropriate operation region" shown in FIG. 8A and FIG. 8B according to the test circuit configuration of the direct current circuit 4, etc. For example, one rate matched to circuit configurations having a delay increase time constant of the direct current voltage may be used for multiple test circuit configurations.

Third Embodiment

Figure 9:
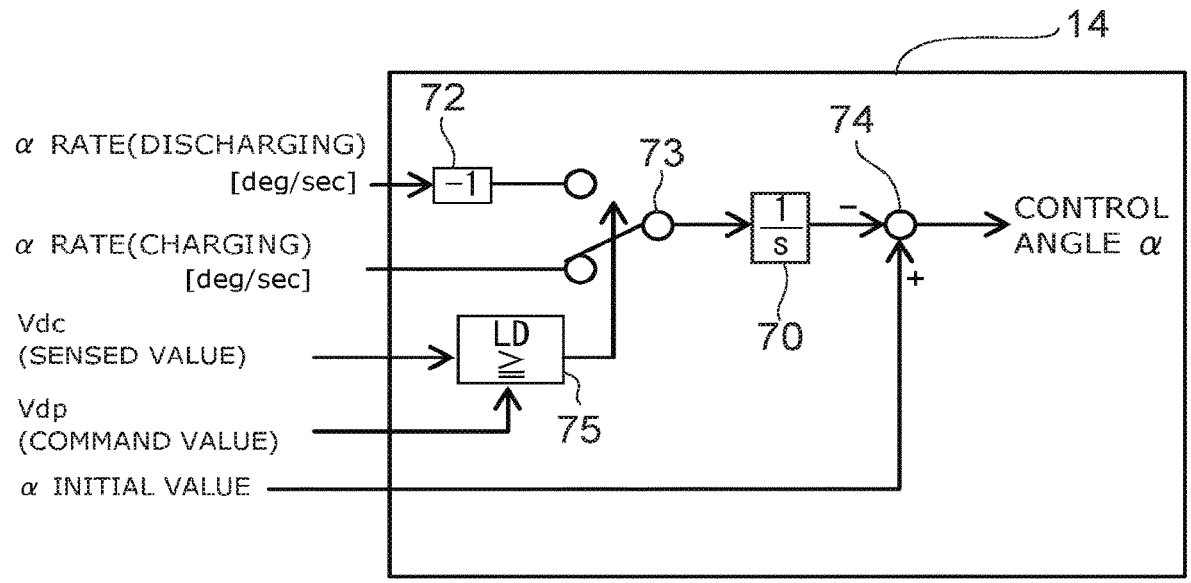
FIG. 9 is a block diagram schematically illustrating a control circuit of an AC-DC conversion device according to a third embodiment.

FIG. 9 is a block diagram schematically illustrating a control circuit of an AC-DC conversion device according to a third embodiment. FIG. 9 is a drawing corresponding to FIG. 7 of the second embodiment.

In the example as illustrated in FIG. 9, the open-line test mode control angle control circuit 242 includes an integrator 70, a multiplier 72, a switcher 73, a subtractor 74, and a level sense circuit 75.

The rate of the control angle α when discharging is input to the multiplier 72. The multiplier 72 multiplies the input rate by the coefficient "−1" and inputs the multiplication result to the switcher 73.

The input of the switcher 73 is connected to the rate of the control angle α when charging and the output of the multiplier 72; and the output of the switcher 73 is connected to the integrator 70. The switcher 73 inputs one of the rate of the control angle α when charging or the output of the multiplier 72 to the integrator 70.

The integrator 70 integrates the rate every sampling period of the operator inside the open-line test mode control angle control circuit 242 and inputs the integration result to the subtractor 74. The rate of the control angle α when discharging may be the same as or different from the rate of the control angle α when charging. The integrator 70 inputs the integration result of the rate to the subtractor 74. The integrator 70 is configured to use a not-illustrated reset signal so that the reset signal is input and the integrator 70 is in the reset state before De-Block; and after De-Block, the reset signal no longer exists and the integrator 70 starts the integration.

The level sense circuit 75 senses whether or not the sensed value Vdc of the direct current voltage of the direct current circuit 4 sensed by the voltage sensor 45 is the voltage command value Vdp or more and inputs the sensing result to the switcher 73. In the case where the sensed value Vdc of the direct current voltage is sensed to be less than the voltage command value Vdp, the switcher 73 inputs the integration result of the rate of the control angle α when charging to the integrator 70. Also, in the case where the sensed value Vdc of the direct current voltage is sensed to be the voltage command value Vdp or more, the switcher 73 inputs the output of the multiplier 72 to the integrator 70.

The subtractor 74 subtracts the output of the integrator 70 from the initial value of the control angle α. Thereby, in the case where the integration result of the rate when charging is input, the control angle α approaches 90° from the 180° vicinity every sampling period of the operator inside the open-line test mode control angle control circuit 242. On the other hand, in the case where the integration result of the rate when discharging is input, the control angle α increases according to this rate every input timing of the control pulse. In other words, in the case where the integration result of the rate when discharging is input, the direct current voltage that is applied to the direct current circuit 4 by the converters 21 and 22 decreases.

In the control method of the second embodiment recited above, there is a possibility that the control angle α may be held in a state in which the direct current voltage is higher than the voltage command value Vdp due to the fluctuation of the system voltage, etc. Therefore, in the embodiment, in the case where the direct current voltage is higher than the voltage command value Vdp, the control angle α is delayed at a rate determined beforehand.

Thereby, the direct current voltage can be matched to the voltage command value Vdp more appropriately.

In the case where the control angle α is delayed, the direct current voltage decreases according to the discharging time constant of the direct current circuit 4. Therefore, in the case where the control angle α is delayed faster compared to the discharging time constant, there is a possibility that the direct current voltage may oscillate up and down with the voltage command value Vdp at the center. Accordingly, the rate of the control angle α when discharging is set so that the degree of the decrease of the direct current voltage is sufficiently slow with respect to the discharging time constant of the direct current circuit 4. In the case where the direct current voltage is higher than the voltage command value Vdp, the open-line test mode control angle control circuit 242 increases the control angle α at a rate that is slower than the discharging time constant of the direct current circuit 4.

For example, the theoretical value of the rate of the control angle α when discharging can be determined by the discharging time constant t of the direct current circuit 4 that is determined by the equivalent leak resistance of the direct current circuit 4, a discharge resistance R that includes the equivalent leak resistance of the switch portions and/or the voltage-dividing resistors RD1 to RD7, and the direct current line capacitance 4c. The rate of the control angle α when discharging is set to, for example, about 1 deg/sec in the case where the discharging time constant t of the direct current circuit 4 is 10 s to cause the voltage applied to the direct current circuit 4 by the converters 21 and 22 to decrease more slowly than the discharging time constant. Thereby, when discharging, the degree of the decrease of the direct current voltage can be set in the appropriate operation region. Multiple rates when charging and multiple rates when discharging may be prepared; and the rates for the appropriate operation region may be appropriately selected.

Fourth Embodiment

Figure 10:
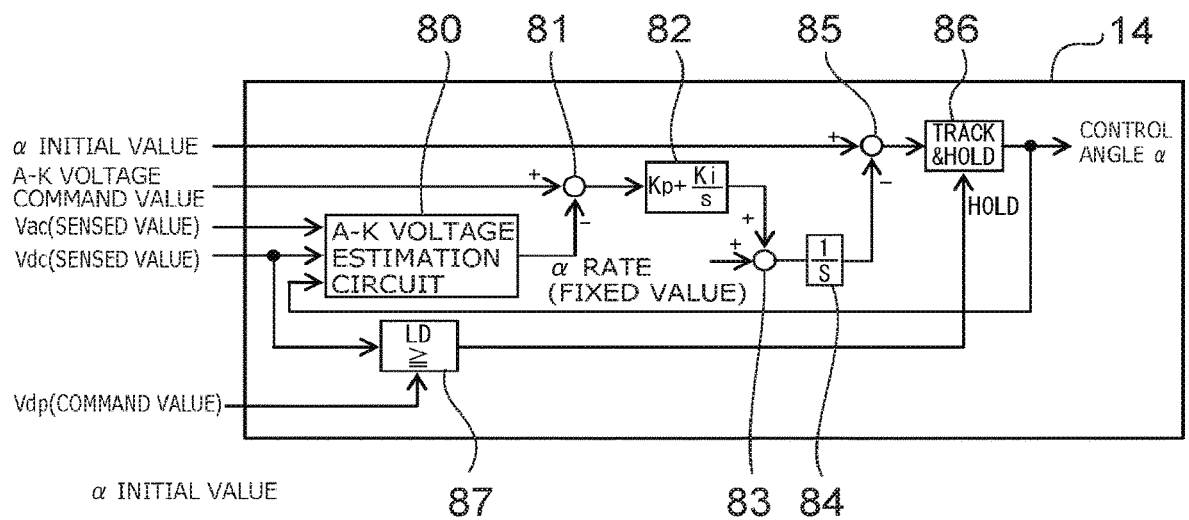
FIG. 10 is a block diagram schematically illustrating a control circuit of an AC-DC conversion device according to a fourth embodiment.

FIG. 10 is a block diagram schematically illustrating a control circuit of an AC-DC conversion device according to a fourth embodiment. FIG. 10 is a drawing corresponding to FIG. 7 of the second embodiment.

In the example as illustrated in FIG. 10, the open-line test mode control angle control circuit 242 includes an anode-cathode voltage estimation circuit 80 when each of the switch portions 31 and 32 is triggered (ON) (hereinbelow, called the "A-K voltage estimation circuit 80"), a subtractor 81, a proportional integrator 82, an adder 83, an integrator 84, a subtractor 85, a track-and-hold circuit 86, and a level sense circuit 87.

The sensed values of an alternating current voltage Vac sensed by the voltage sensors 46a, 46b, and 46c, the sensed value of the direct current voltage Vdc sensed by the voltage sensor 45, and the control angle α are input to the A-K voltage estimation circuit 80.

When each of the switch portions 31 and 32 is triggered (ON), the A-K voltage estimation circuit 80 estimates the voltage (an A-K voltage $V_{A-K}$) applied to the two ends of each of the switch portions 31 and 32 based on the alternating current voltage Vac, the direct current voltage Vdc, and the control angle α. Then, the A-K voltage estimation circuit 80 inputs the estimated value of the A-K voltage $V_{A-K}$ to the subtractor 81.

For example, the A-K voltage estimation circuit 80 estimates the A-K voltage $V_{A-K}$ by the following Formula (6). Here, N is the transformation ratio of the transformers 23 and 24 and is the ratio of the secondary voltage to the primary voltage.

[Formula 6]

$$V_{A-K} = k(V_{acpeak} \times \sin \alpha - (1/4)V_{dc}) \quad (6)$$

In Formula (6), k is, for example, a constant determined by the condenser capacitance and the resistance value of the snubber circuit. For example, k is 1.5. $V_{acpeak}$ is the peak value of the alternating current voltage Vac sensed by the voltage sensors 46a, 46b, and 46c. $V_{acpeak}$ is the peak value of the alternating current phase voltage sensed by the voltage sensors 46a, 46b, and 46c; and N is the transformation ratio of the transformers 23 and 24 and is the ratio of the secondary voltage to the primary voltage. Also, instead of $V_{acpeak}$, the value of √2 times the effective value of the alternating current phase voltage sensed by the voltage sensors 46a, 46b, and 46c may be used.

The estimated value of the A-K voltage $V_{A-K}$ is input to the subtractor 81; and the command value of the A-K voltage $V_{A-K}$ is input to the subtractor 81. The subtractor 81 calculates the difference between the command value and the estimated value by subtracting the estimated value from the command value of the A-K voltage $V_{A-K}$. The subtractor 81 inputs the calculated difference to the proportional integrator 82.

By performing a proportional integration operation of the input difference, the proportional integrator 82 calculates the correction value of the rate of the control angle α corresponding to the difference of the A-K voltage. The proportional integrator 82 inputs the calculated correction value to the adder 83.

The correction value of the rate of the control angle α is input to the adder 83; and the reference value of the rate of the control angle α is input to the adder 83. The adder 83 corrects the rate of the control angle α by adding a correction value for the reference value of the rate of the control angle α. The adder 83 inputs the rate after the correction to the integrator 84.

For example, the integrator 84 integrates the rate after the correction every input timing of the control pulse to each of the switch portions 31 and 32. Then, the integrator 84 inputs the integration result of the rate to the subtractor 85. The integration result of the rate is input to the subtractor 85; and the initial value of the control angle α is input to the subtractor 85. The subtractor 85 subtracts the integration result of the rate from the initial value of the control angle α and inputs the subtraction result to the track-and-hold circuit 86. The integrator 84 is configured to use a not-illustrated reset signal so that the reset signal is input before De-Block and the integrator 84 is in the reset state; and after De-Block, the reset signal no longer exists and the integrator 84 starts the integration.

Thereafter, similarly to the description of FIG. 7, according to the sensing result of the level sense circuit 87, one of the control angle α calculated by the subtractor 85 or the control angle α held by the track-and-hold circuit 86 is output from the track-and-hold circuit 86. Also, the track-and-hold circuit 86 inputs the control angle α to the A-K voltage estimation circuit 80. In other words, the track-and-hold circuit 86 feeds-back the control angle α to the A-K voltage estimation circuit 80.

For example, in the control methods of the first to third embodiments, the appropriate rate to advance the control angle α cannot be estimated without the condition of the capacitance value of the direct current line capacitance 4c, the inductance component, etc., of the direct current circuit 4 being known. Therefore, in the case where the actual capacitance value and the like of the direct current line capacitance 4c are different from the estimated values, in the case where the open-line test is performed in a circuit configuration that is different from that assumed, etc., there is a possibility that the A-K voltage when each of the switch portions 31 and 32 is triggered (ON) may become more excessively large or more excessively small than the value assumed by the digital simulation result, etc., beforehand; and the "appropriate operation region" illustrated in FIG. 8A and FIG. 8B may be departed from.

In the embodiment, the A-K voltage when each of the switch portions 31 and 32 is triggered (ON) is estimated; and the control angle α is changed based on the estimated value of the A-K voltage. The open-line test mode control angle control circuit 242 corrects the rate of the decrease of the control angle α based on the estimated value of the A-K voltage estimation circuit 80. For example, even for the condition of the capacitor capacitance, the inductance component, etc., of the direct current circuit 4 being unknown, the direct current circuit 4 can be charged in the "appropriate operation region" illustrated in FIG. 8A and FIG. 8B. In the control block of FIG. 10, for example, in the case where the direct current voltage increases too much after the control angle α is held, a control of delaying the held value of α may be added. Also, in the case where a short occurs in the direct current circuit 4, because the control angle α is controlled to be delayed in the 180° direction when referenced to the phase voltage by setting the direct current voltage≈0 V, a state in which an excessive voltage is applied to the direct current circuit 4 and an excessive current is caused to flow is not continued when the direct current circuit is shorted. Also, even in the case where there is an insulation defect in a portion of the direct current circuit 4 and the direct current voltage does not increase to the assumed value, because the operation is continued at the control angle α reflecting the value of the direct current voltage, the A-K voltage when triggered (ON) does not become excessive.

It is apparent from Formula (6) recited above that the A-K voltage when each of the switch portions 31 and 32 is triggered (ON) decreases according to the increase of the direct current voltage. Accordingly, it is necessary to advance the control angle α to match the increase of the direct current voltage to maintain the A-K voltage when each of the switch portions 31 and 32 is triggered (ON) at the value corresponding to the command value. Thus, in the example as well, the control angle α decreases toward 90° when referenced to the phase voltage.

Fifth Embodiment

Figure 11:
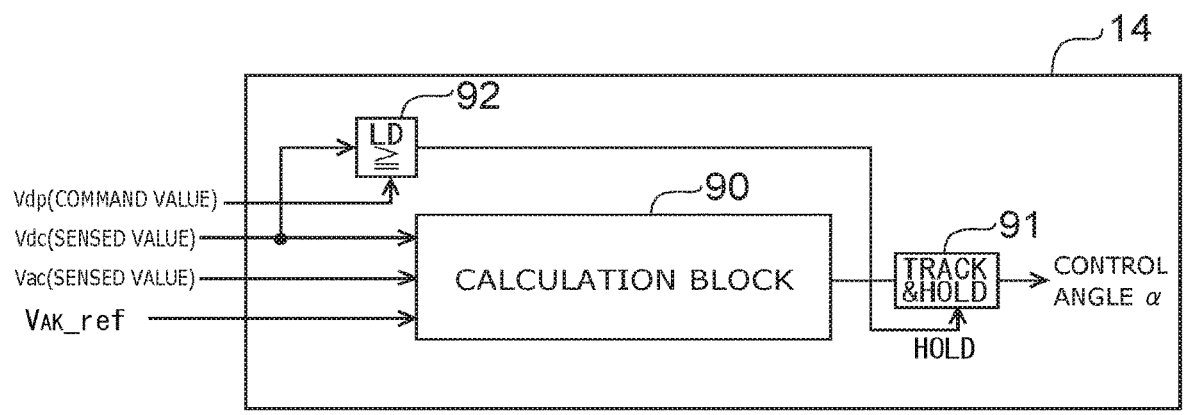
FIG. 11 is a block diagram schematically illustrating a control circuit of an AC-DC conversion device according to a fifth embodiment.

FIG. 11 is a block diagram schematically illustrating a control circuit of an AC-DC conversion device according to a fifth embodiment. FIG. 11 is a drawing corresponding to FIG. 7 of the second embodiment.

In the example as illustrated in FIG. 11, the open-line test mode control angle control circuit 242 includes a calculation block 90, a track-and-hold circuit 91, and a level sense circuit 92.

The sensed values of the alternating current voltage Vac sensed by the voltage sensors 46a, 46b, and 46c, the sensed value of the direct current voltage Vdc sensed by the voltage sensor 45, and a command value $V_{AK}$_ref of the A-K voltage are input to the calculation block 90. The calculation block 90 calculates the control angle α corresponding to the command value $V_{AK}$_ref of the A-K voltage by Formula (7) recited below based on the sensed value of the alternating current voltage Vac, the sensed value of the direct current voltage Vdc, and the command value $V_{AK}$_ref of the A-K voltage. Then, the calculation block 90 inputs the calculated control angle α to the track-and-hold circuit 91. Also, it is possible to calculate the control angle α corresponding to the command value $V_{AK\_ref}$ of the A-K voltage in Formula (8) as well.

[Formula 7]

$$\alpha = \sin^{-1}\left[\frac{(V_{AK\_ref}/k) + (V_{dc}/4)}{V_{acpeak} \times N}\right] \quad (7)$$

[Formula 8]

$$\alpha = \cos^{-1}\left[-\sqrt{1 - \left\{\frac{(V_{AK\_ref}/k) + (V_{dc}/4)}{V_{acpeak} \times N}\right\}^2}\right] \quad (8)$$

Here, α is the range of 90° to 180° when referenced to the phase voltage.

In Formula (7) and Formula (8), similarly to Formula (6), k is, for example, a constant determined by the condenser capacitance and the resistance value of the snubber circuit. For example, k is 1.5. $V_{acpeak}$ is the peak value of the alternating current voltage Vac sensed by the voltage sensors 46a, 46b, and 46c. $V_{acpeak}$ is the peak value of the alternating current phase voltage sensed by the voltage sensors 46a, 46b, and 46c; and N is the transformation ratio of the transformers 23 and 24 and is the ratio of the secondary voltage to the primary voltage. Also, instead of $V_{acpeak}$, the value of √2 times the effective value of the alternating current phase voltage sensed by the voltage sensors 46a, 46b, and 46c may be used.

Then, similarly to the description of FIG. 7, according to the sensing result of the level sense circuit 92, one of the control angle α calculated by the calculation block 90 or the control angle α held by the track-and-hold circuit 91 is output from the track-and-hold circuit 91.

In the example, because the control angle α is controlled so that the A-K voltage when triggered (ON) is maintained at a constant, the direct current circuit 4 can be charged in the "appropriate operation region" shown in FIG. 8A and FIG. 8B. Also, compared to the open-line test mode control angle control circuit 242 shown in FIG. 10, the proportional integrator 82, etc., are unnecessary; and the open-line test mode control angle control circuit 242 can be simplified.

In the control block of FIG. 11, for example, in the case where the direct current voltage increases too much after the control angle α is held, a control of delaying the held value of α may be added. Also, in the case where a short occurs in the direct current circuit 4, because the control angle α is controlled to be delayed in the 180° direction when referenced to the phase voltage by setting the direct current voltage≈0 V, the state in which an excessive voltage is applied to the direct current circuit 4 and an excessive current is caused to flow is not continued when the direct current circuit is shorted.

Sixth Embodiment

Figure 12:
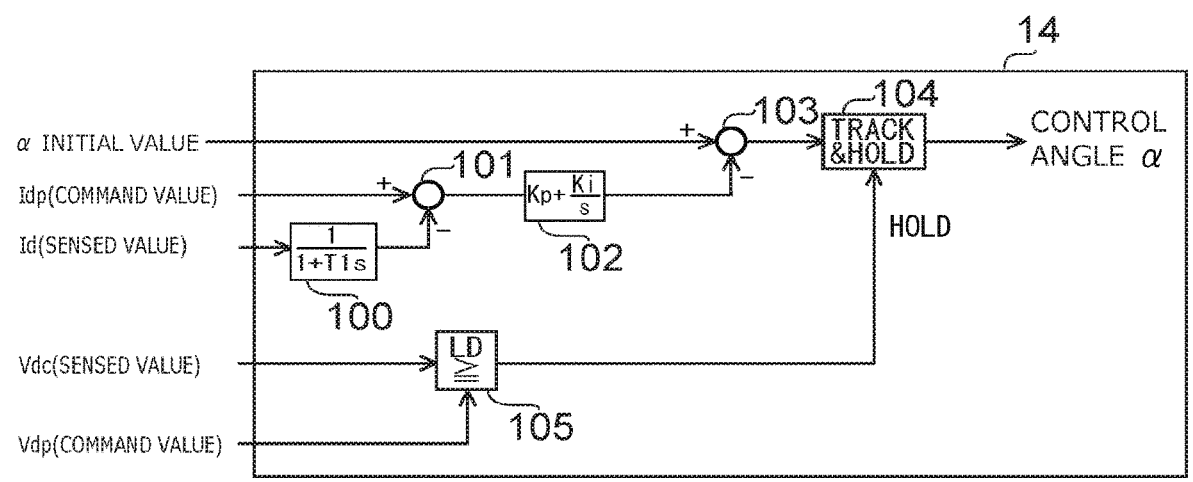
FIG. 12 is a block diagram schematically illustrating a control circuit of an AC-DC conversion device according to a sixth embodiment.

FIG. 12 is a block diagram schematically illustrating a control circuit of an AC-DC conversion device according to a sixth embodiment. FIG. 12 is a drawing corresponding to FIG. 7 of the second embodiment.

In the example as illustrated in FIG. 12, the open-line test mode control angle control circuit 242 includes a primary delay circuit 100, a subtractor 101, a proportional integrator 102, a subtractor 103, a track-and-hold circuit 104, and a level sense circuit 105.

A sensed value Id of the direct current sensed by the current sensor 44 is input to the primary delay circuit 100. The primary delay circuit 100 smoothes the sensed value Id of the direct current using a primary delay time constant and inputs the primary delay output to the subtractor 101. The output of the primary delay circuit 100 is input to the subtractor 101; and a command value Idp of the direct current is input to the subtractor 101. The subtractor 101 subtracts the output of the primary delay circuit 100 from the command value Idp of the direct current and inputs the output of the subtraction to the proportional integrator 102.

The proportional integrator 102 calculates the correction value of the control angle α corresponding to the difference of the direct current by performing a proportional integration operation of the output of the subtractor 101. The proportional integrator 102 inputs the calculated correction value to the subtractor 103.

Thereafter, the operations of the subtractor 103, the track-and-hold circuit 104, and the level sense circuit 105 are substantially the same as the operations described in reference to the fourth embodiment; and a detailed description is therefore omitted.

Thus, in the embodiment, the direct current when charging the direct current circuit is controlled to be substantially constant with respect to the command value. The open-line test mode control angle control circuit 242 corrects the decrease of the control angle α based on the sensed value of the current sensor 44 so that the direct current is substantially constant. Thereby, the control angle α is advanced at the appropriate rate; and the direct current circuit 4 can be charged in the "appropriate operation region" shown in FIG. 8A and FIG. 8B. Also, similarly to the fourth embodiment recited above, even for the condition of the capacitor capacitance, the inductance component, etc., of the direct current circuit 4 being unknown, the direct current circuit 4 can be charged in the "appropriate operation region" illustrated in FIG. 8A and FIG. 8B.

In the control block of FIG. 12, for example, in the case where the direct current voltage increases too much after the control angle α is held, a control of delaying the held value of α may be added. Also, in the case where a short occurs in the direct current circuit 4, because the control angle α is controlled to be delayed in the 180° direction by setting the direct current voltage≈0 V, the state in which an excessive voltage is applied to the direct current circuit 4 and an excessive current is caused to flow is not continued when the direct current circuit is shorted.

Seventh Embodiment

Figure 13:
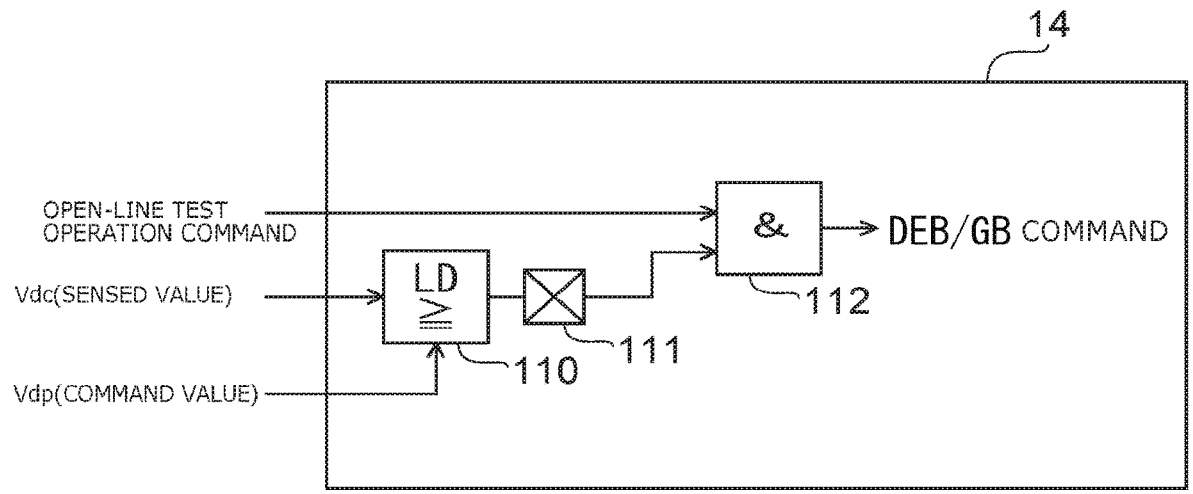
FIG. 13 is a block diagram schematically illustrating a portion of a control circuit of an AC-DC conversion device according to a seventh embodiment.

FIG. 13 is a block diagram schematically illustrating a portion of a control circuit of an AC-DC conversion device according to a seventh embodiment. This circuit may be included as a portion of the start/stop sequence circuit 244.

Figure 14:
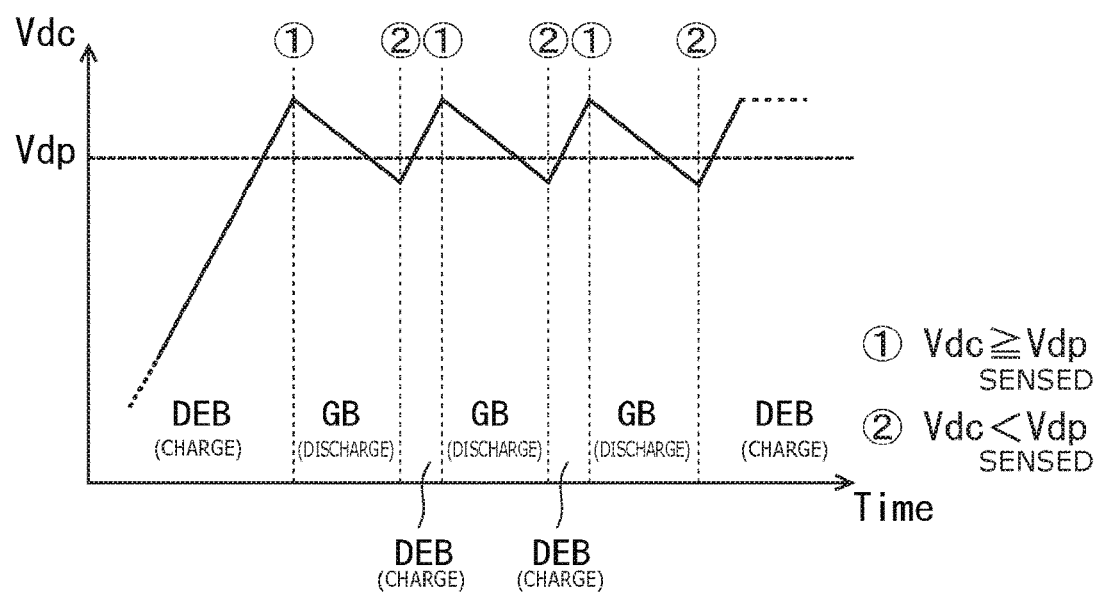
FIG. 14 is a graph schematically illustrating an example of the operation of the control circuit according to the seventh embodiment.

FIG. 14 is a graph schematically illustrating an example of the operation of the control circuit according to the seventh embodiment.

In the example as illustrated in FIG. 13, the start/stop sequence circuit 244 includes a level sense circuit 110, a NOT gate 111, and an AND circuit 112.

The sensed value Vdc of the direct current voltage sensed by the voltage sensor 45 and the voltage command value Vdp of the direct current voltage are input to the level sense circuit 110. The level sense circuit 110 senses whether or not the sensed value Vdc of the direct current voltage is the voltage command value Vdp or more. In the case where the sensed value Vdc is the voltage command value Vdp or more, the level sense circuit 110 sets the output of the level sense circuit 110 to the High level and inputs the output to the NOT gate 111. The NOT gate 111 reverses the input sense signal and inputs the reversed input sense signal to the AND circuit 112.

The output signal from the NOT gate 111 is input to the AND circuit 112; and the operation command of the open-line test is input to the AND circuit 112. The AND circuit 112 activates the control pulse output to each of the switch portions 31 and 32 (DEB: De-Block state) when the operation command of the open-line test is input and the signal from the NOT gate 111 is the High level, and stops the control pulse output to each of the switch portions 31 and 32 in the other states (GB: Gate-Block state). In other words, GB and DEB have a mutually-reversed relationship. The control circuit 14 performs the input of the control pulse to each of the switch portions 31 and 32 when the de-block signal from the AND circuit 112 is output, and does not perform the input of the control pulse to each of the switch portions 31 and 32 when the gate-block signal from the AND circuit 112 is output.

In other words, the AND circuit 112 activates the control pulse output to each of the switch portions 31 and 32 (DEB: De-Block state) only when the operation command of the open-line test is input and the sensed value Vdc of the direct current voltage sensed by the voltage sensor 45 is lower than the voltage command value Vdp. In FIG. 13, the output of the AND circuit 112 is High in the DEB state. The High signal can be obtained in the GB state by providing a NOT gate at the output of the AND circuit 112.

In the example as illustrated in FIG. 14, DEB/GB (De-Block/Gate Block) is switched by the magnitude of the direct current voltage Vdc. Specifically, the state transitions to the GB state and the direct current circuit 4 is discharged when the direct current voltage Vdc is sensed to be the voltage command value Vdp or more; and the state transitions to the DEB state when the direct current voltage Vdc is sensed to again be less than the voltage command value Vdp.

In the control of holding the control angle α, there is a possibility that the operation may continue in the "excessively small AK-voltage-when-triggered (ON) region" shown in FIG. 8A and FIG. 8B by holding the control angle α after the direct current voltage is charged to the voltage command value.

Conversely, in the control circuit 14 according to the embodiment, the operation can be continued at the control angle α calculated by the method shown in the fourth to sixth embodiments recited above without holding the control angle α even after the direct current voltage is charged to the voltage command value. Thereby, even in the case where the state transitions to the DEB state again after transitioning to the GB state, the operation in the "appropriate operation region" shown in FIG. 8A and FIG. 8B becomes possible.

Also, in the control of holding the control angle α, there is a possibility that the direct current voltage may undesirably fluctuate to match the system voltage in the case where the system voltage fluctuates after the hold of the control angle α. Conversely, in the control circuit 14 according to the embodiment, it is possible to control the direct current voltage to match the voltage command value even in the case where the system voltage fluctuates to be high by calculating the control angle α by the methods shown in the fourth to sixth embodiments recited above without holding the control angle α even after the direct current voltage is charged to the voltage command value.

In the case where the switching operation of DEB/GB is performed as recited above, it is assumed that fluctuation may occur in the number of times being triggered (ON) between the phases of the switch portions 31 and 32 having the twelve-phases. In the case where fluctuation occurs between the phases in the number of times being triggered (ON), there is a possibility that bias magnetism may occur in the transformers 23 and 24. Also, in the case where fluctuation occurs between the phases in the number of times being triggered (ON), there is a possibility that an unbalance may occur in the direct current voltage distributed to the condensers of the snubber circuits included in the switch portions 31 and 32.

To suppress the occurrence of the bias magnetism in the transformers 23 and 24, it is necessary to perform a control using the combination of switch portions that form pair arms of the switch portions 31 and 32 so that the fluctuation does not occur in the number of times being triggered (ON). The combination of switch portions that form pair arms are, for example, the switch portions (31u and 31x), (31v and 31y), (31w and 31z), (32u and 32x), (32v and 32y), and (32w and 32z).

It is necessary to perform a control so that the fluctuation does not occur in the number of times being triggered (ON) between the four groups of switch portions of (31u, 31v, and 31w), (31x, 31y, and 31z), (32u, 32v, and 32w), and (32x, 32y, and 32z) of the switch portions 31 and 32 so that unbalance does not occur in the direct current voltage distributed to the condensers of the snubber circuits included in the switch portions 31 and 32.

Accordingly, in the case where the switching operation of DEB/GB is performed as recited above, the control circuit 14 may perform the determination of switching DEB/GB each time a prescribed interval elapses. For example, the control circuit 14 performs the determination of switching DEB/GB every one period unit of the alternating current power of the alternating current power supply 2. In other words, in the case of 50 Hz, the determination of the switching is performed every 20 ms; and in the case of 60 Hz, the determination of the switching is performed every 16.7 ms. Thereby, the fluctuation between the phases in the number of times being triggered (ON) can be suppressed.

For example, in the case where DEB/GB is switched, the switching may be performed using a prescribed phase as the starting point. For example, when switching DEB/GB, the switching of the DEB/GB may be performed by always using the switch portion 31u of the switch portions 31 and 32 as the starting point.

Eighth Embodiment

In the case where fluctuation occurs between the phases in the number of times being triggered (ON) of the switch portions 31 and 32 having the twelve-phases, there is a possibility that bias magnetism may occur in the transformers 23 and 24; and there is a possibility that an unbalance may occur in the direct current voltage distributed to the condensers of the snubber circuits included in the switch portions 31 and 32. To suppress these possibilities, it is necessary to set the number of times being triggered (ON) to be equal by using the combination of switch portions that form pair arms, and further to set the number of times being triggered (ON) to be equal between the four groups of the switch portions of (31u, 31v, and 31w), (31x, 31y, and 31z), (32u, 32v, and 32w), and (32x, 32y, and 32z) of the switch portions 31 and 32.

Figure 15B:
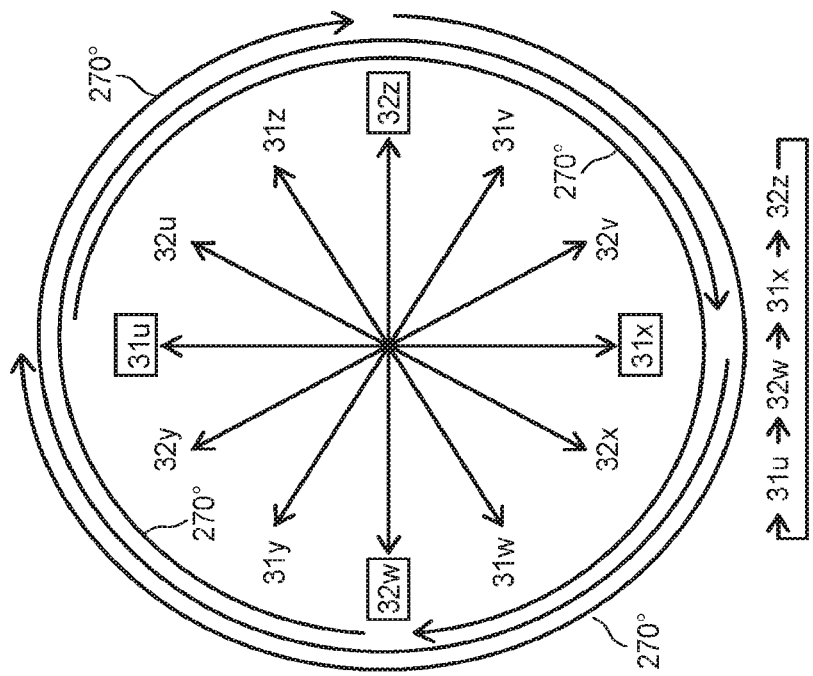
FIG. 15A and FIG. 15B are conceptual views schematically illustrating an example of operations of the AC-DC conversion device according to the eighth embodiment.
Figure 15A:
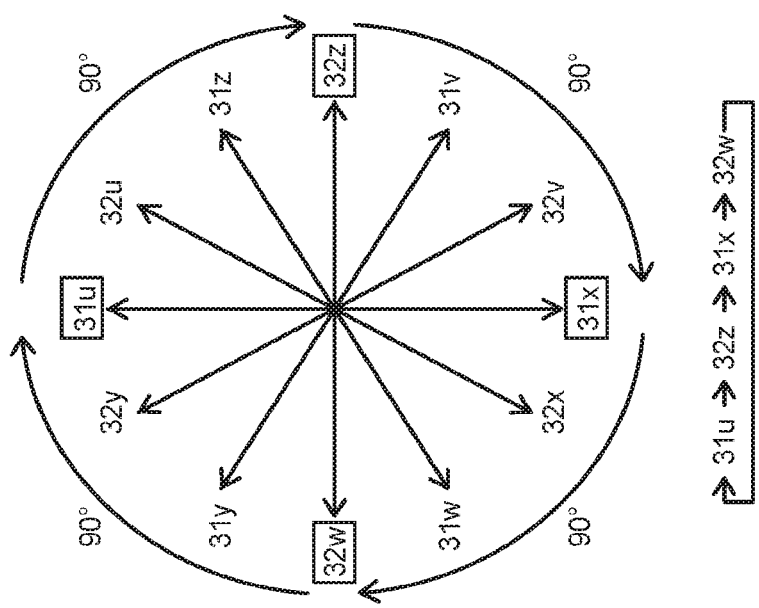

FIGS. 15A and B are descriptive views thereof.

Accordingly, even in the case of inputting a control pulse for the same number of times and triggering (switching ON) only the switch portions of four designated phases such as, for example, (31u, 32z, 31x, and 32w) of the switch portions 31 and 32 having the twelve-phases, the bias magnetism of the transformers 23 and 24 and the unbalance of the direct current voltage distributed by the condensers of the snubber circuits included in the switch portions 31 and 32 can be suppressed. To input the control pulse the same number of times to only the switch portions of four designated phases such as (31u, 32z, 31x, and 32w), it is sufficient to perform a control so that the control pulse is output every 90° with respect to the alternating current voltage phase as in FIG. 15A or every 270° with respect to the alternating current voltage phase as shown in FIG. 13B.

Although the first to seventh embodiments have the premise of triggering (switching ON) the switch portions by inputting the control pulses to all of the switch portions of the switch portions 31 and 32 having the twelve-phases, the direct current circuit 4 may be charged by triggering (switching ON) designated switch portions by inputting the control pulses only to the designated switch portions of the switch portions 31 and 32 having the twelve-phases as shown in FIG. 15.

In the case where the control pulses are input to only the designated switch portions of the switch portions 31 and 32 having the twelve-phases as shown in FIG. 15, the charge rate of the direct current circuit 4 can be set to a low rate compared to the case where the control pulses are input to all of the switch portions 31 and 32 having the twelve-phases.

Figure 16:
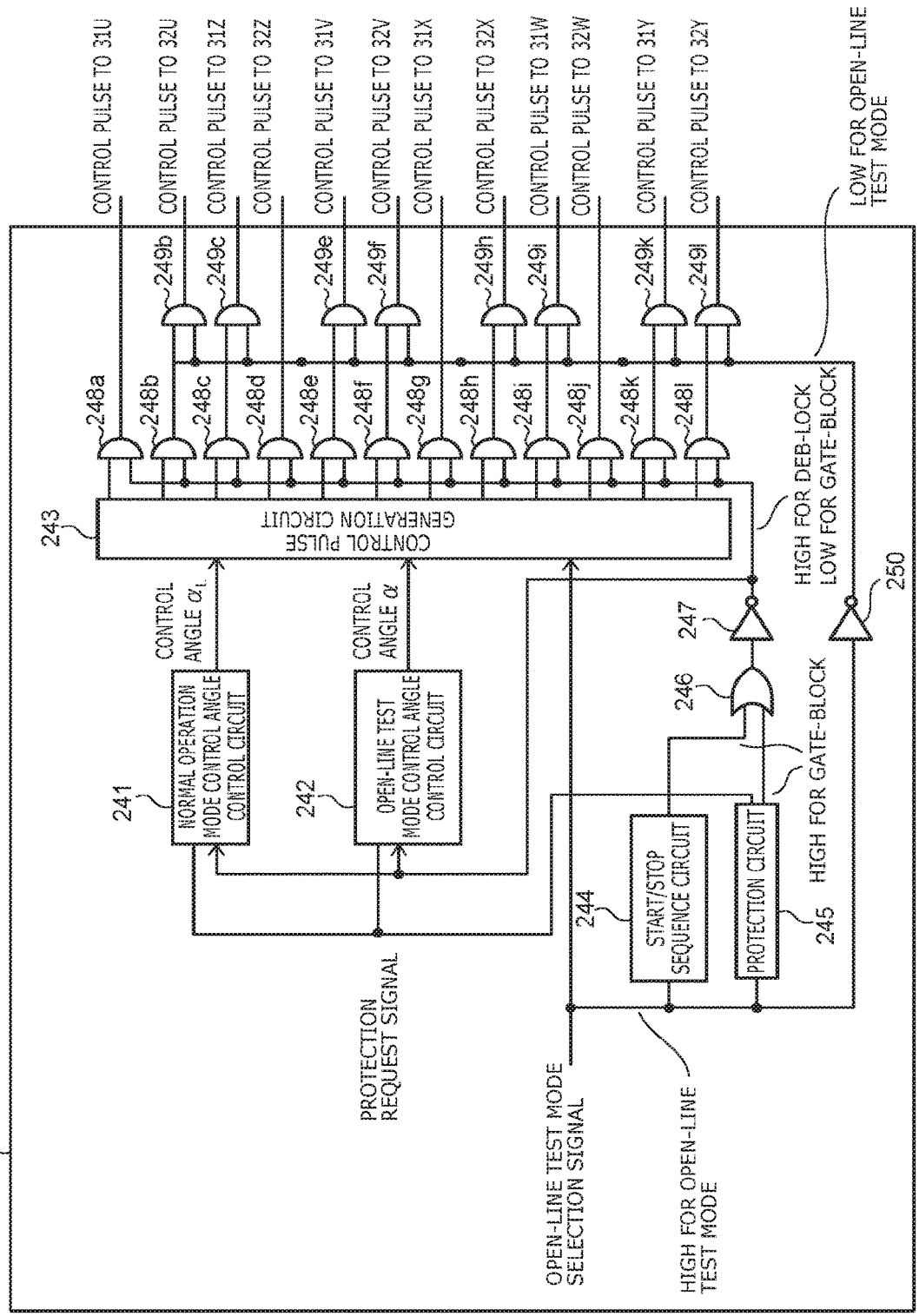
FIG. 16 is a block diagram schematically illustrating a portion of a control circuit of an AC-DC conversion device according to the eighth embodiment.

FIG. 16 is a block diagram schematically illustrating a portion of the control circuit 14 for performing the operations of FIG. 15A. Components having the same configurations as those of FIG. 3 are marked with the same numerals; and a description is omitted.

FIG. 16 is the circuit of FIG. 3 in which AND circuits 249b, 249c, 249e, 249f, 249h, 249i, 249k, and 249l are added respectively to the outputs of AND circuits 248b, 248c, 248e, 248f, 248h, 248i, 248k, and 248l; further, a NOT gate 250 is added; the output of the NOT gate 250 is connected to the other inputs of the AND circuits 249b, 249c, 249e, 249f, 249g, 249h, 249k, and 249l; and the input signal of the NOT gate 250 is the open-line selection signal.

Thereby, in the open-line test mode, the open-line test selection signal is High; therefore, the output of the NOT gate 250 is Low; and the outputs of the AND circuits 249b, 249c, 249e, 249f, 249h, 249i, 249k, and 249l are Low.

Accordingly, in the open-line test mode, the control pulses are output from the control circuit 14 for the same number of times to only the switch portions of four designated phases such as, for example, (31u, 32z, 31x, and 32w) of the switch portions 31 and 32 having the twelve-phases.

Figure 17:
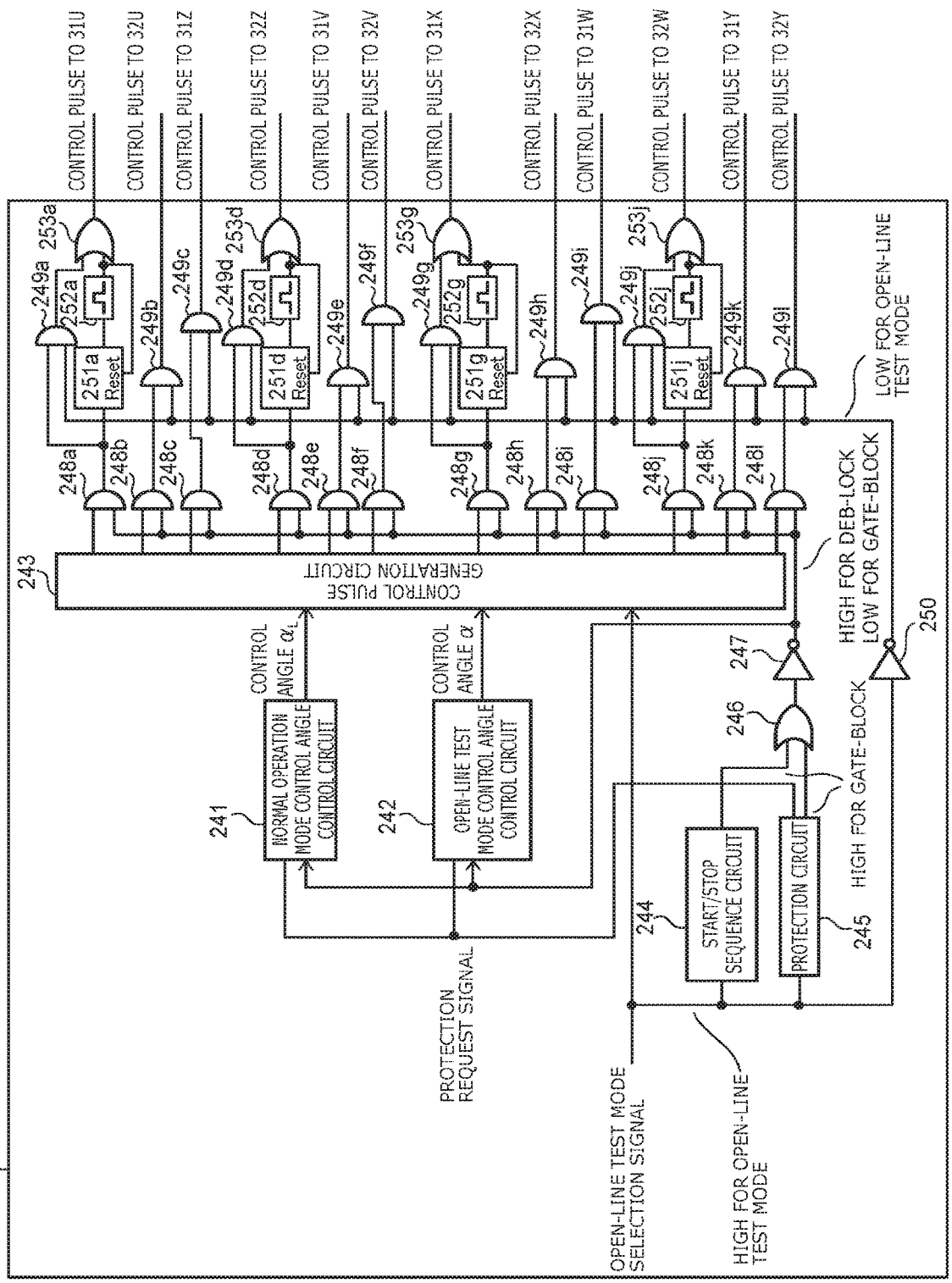
FIG. 17 is a block diagram schematically illustrating a portion of a control circuit of an AC-DC conversion device of another embodiment according to the eighth embodiment.

FIG. 17 is a block diagram schematically illustrating a portion of the control circuit 14 for performing the operations of FIG. 15B. Components having the same configurations as those of FIG. 16 are marked with the same numerals; and a description is omitted.

FIG. 17 is the circuit of FIG. 16 in which the AND circuits 249a, 249d, 249g, and 249j and counter circuits 251a, 251d, 251g, and 251j are added respectively to the outputs of the AND circuits 248a, 248d, 248g, and 248j; further, one-shot circuits 252a, 252d, 252g, and 252j and OR circuits 253a, 253d, 253g, and 253j are added. The output of the NOT gate 247 is connected to one other input of each of the AND circuits 248a, 248d, 248g, and 248j.

The output of the NOT gate 250 is connected to the other input of each of the AND circuits 249a, 249d, 249g, and 249j. The counters 251a, 251d, 251g, and 251j are set to output High when counting the input signal three times. The outputs of the counter circuits 251a, 251d, 251g, and 251j are connected respectively to the one-shot circuits 252a, 252d, 252g, and 252j. The outputs of the one-shot circuits 252a, 252d, 252g, and 252j are connected respectively to the reset inputs of the counter circuits 251a, 251d, 251g, and 251j. Also, the outputs of the one-shot circuits 252a, 252d, 252g, and 252j are connected respectively to one input of each of the OR circuits 253a, 253d, 253g, and 253j. Further, the AND circuits 249a, 249d, 249g, and 249j are connected respectively to one other input of each of the OR circuits 253a, 253d, 253g, and 253j.

Thereby, in the open-line test mode, the open-line test selection signal is High; therefore, the output of the NOT gate 250 is Low; and the outputs of the AND circuits 249a to 249l are Low. The counter circuits 251a, 251d, 251g, and 251j output every three input signals; therefore, the signals are output to the one-shot circuits 252a, 252d, 252g, and 252j. Further, the control pulses are transmitted to 31u, 32z, 31x, and 32w of the switch portions 31 and 32 having the twelve-phases via the OR circuits 253a, 253d, 253g, and 253j from the one-shot circuits.

Thereby, the control circuit 14 outputs the control pulse every 270°. In the normal operation mode, the output of the NOT gate 250 is High; therefore, the outputs of the AND circuits 248a, 248b, 248c, 248d, 248e, 248f, 248g, 248h, 248i, 248j, 248k, and 248l are the output of the control circuit 14 as-is.

Accordingly, in the open-line test mode, the control pulses are output from the control circuit 14 for the same number of times to only the switch portions of four designated phases such as, for example, (31u, 32z, 31x, and 32w) of the switch portions 31 and 32 having the twelve-phases.

The charging time constant of the direct current circuit 4 becomes small in the case where the capacitance of the direct current line capacitance 4c of the direct current circuit 4 is small. At this time, in the case where the control pulses are input to all of the switch portions 31 and 32 having the twelve-phases, there is a possibility that the charge rate of the direct current circuit 4 may become a high rate; and the control may become unstable. On the other hand, in the case where the control pulses are input to only the designated switch portions of the switch portions 31 and 32 having the twelve-phases, even for the condition of the charging time constant of the direct current circuit 4 being small, the charge rate can be prevented from becoming too fast; and the stability of the control can be increased.

It is possible to combine the eighth embodiment with the first to seventh embodiments recited above. Also, both the mode of inputting the control pulses to all of the switch portions 31 and 32 having the twelve-phases inside the control circuit and the mode of inputting the control pulses to only designated switch portions of the switch portions 31 and 32 having the twelve-phases can be implemented; and the two modes may be switched according to the configuration of the direct current circuit 4.

Ninth Embodiment

Figure 18:
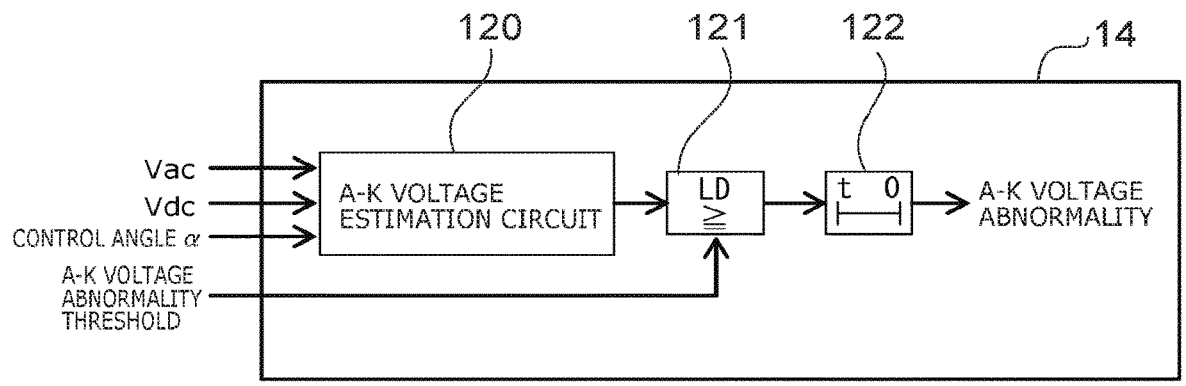
FIG. 18 is a block diagram schematically illustrating a control circuit of an AC-DC conversion device according to a ninth embodiment.

FIG. 18 is a block diagram schematically illustrating a control circuit of an AC-DC conversion device according to a ninth embodiment.

An example of a block diagram of the portion of the control circuit 14 performing the protection of the circuit is schematically illustrated in FIG. 18. The circuit illustrated in FIG. 18 may be included as a portion of the protection circuit 245.

In the example as illustrated in FIG. 18, the control circuit 14 includes an A-K voltage estimation circuit 120, a level sense circuit 121, and a timer 122.

The A-K voltage estimation circuit 120 estimates the A-K voltage $V_{A-K}$ when each of the switch portions 31 and 32 is triggered (ON) based on the alternating current voltage Vac, the direct current voltage Vdc, and the control angle α and inputs the estimated value to the level sense circuit 121.

The estimated value of the A-K voltage $V_{A-K}$ when triggered (ON) is input to the level sense circuit 121; and the threshold of the abnormality of the A-K voltage $V_{A-K}$ when triggered (ON) is input to the level sense circuit 121. The level sense circuit 121 senses whether or not the estimated value of the A-K voltage $V_{A-K}$ when triggered (ON) is a threshold or more and inputs the sensing result to the timer 122.

In the case where it is sensed that the estimated value of the A-K voltage $V_{A-K}$ when triggered (ON) is the threshold or more, the timer 122 measures a prescribed amount of time. Then, in the case where the state in which the estimated value is the threshold or more has continued for the prescribed amount of time, the timer 122 outputs an abnormality detection signal illustrating the abnormality of the A-K voltage $V_{A-K}$. In other words, in the example, the control circuit 14 senses that the operation in the "excessively large AK-voltage-when-triggered (ON) region" shown in FIG. 8A and FIG. 8B is continuing.

In the case where the abnormality detection signal is output from the timer 122, the control circuit 14 performs a protection operation for protecting the switch portions 31 and 32. Thus, in the case where the estimated value of the triggered (ON) A-K voltage estimation circuit 120 exceeds the threshold, the control circuit 14 performs the protection operation.

For example, the control circuit 14 performs the hold (the stop of the rate change) of the value of the control angle α as the protection operation. Thereby, for example, the damage of the switch portions 31 and 32 due to the excessive snubber loss, etc., can be suppressed. The protection operation may be, for example, an operation of delaying the control angle α. For example, according to the output of the abnormality detection signal, the control angle α may be returned to the initial value (e.g., 170°). The protection operation may be, for example, the stop of the operations of the switch portions 31 and 32 (setting to the GB state).

For example, the cooling conditions (the cooling water temperature, the cooling flow rate, the ambient temperature, the cooling airflow rate, etc.) of the switch portions 31 and 32 may be included in the abnormality detection. For example, the protection operation is performed in the case where the cooling conditions exceed a prescribed threshold. Thereby, it is possible to perform the protection of the switch portions 31 and 32 with higher precision.

Tenth Embodiment

Figure 19:
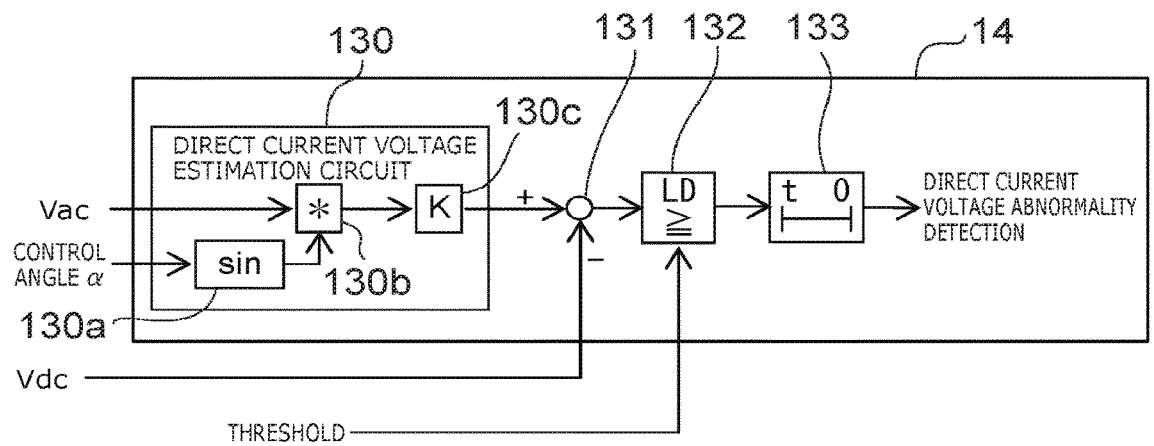
FIG. 19 is a block diagram schematically illustrating a control circuit of an AC-DC conversion device according to a tenth embodiment.

FIG. 19 is a block diagram schematically illustrating a control circuit of an AC-DC conversion device according to a tenth embodiment. The circuit illustrated in FIG. 19 may be included as a portion of the protection circuit 245.

In the example as illustrated in FIG. 19, the control circuit 14 includes a direct current voltage estimation circuit 130, a subtractor 131, a level sense circuit 132, and a timer 133.

For example, the direct current voltage estimation circuit 130 estimates the direct current voltage Vdc by the following Formula (9).

$$V_{dc}=k \times V_{acpeak} \times \sin \alpha \qquad \text{[Formula 9]}$$

In Formula (9), for example, is determined by the pulse number of the converter such as a six-phase or twelve-phase pulse converter, etc. K is 2 when the pulse number of the converter is six phases; and K is 4 when the pulse number of the converter is twelve phases.

The control angle α and the sensed values of the alternating current voltage Vac sensed by the voltage sensors 46a, 46b, and 46c are input to the direct current voltage estimation circuit 130. The direct current voltage estimation circuit 130 includes, for example, a sine wave circuit 130a, a multiplier 130b, and a coefficient circuit 130c. The direct current voltage estimation circuit 130 calculates the voltage value for the control angle α by multiplying the maximum value of the alternating current voltage Vac by sin α. Then, the direct current voltage estimation circuit 130 estimates the direct current voltage by multiplying the calculated voltage value by the prescribed coefficient K. The direct current voltage estimation circuit 130 inputs the estimated value of the calculated direct current voltage to the subtractor 131.

The estimated value of the direct current voltage is input to the subtractor 131; and the sensed value of the direct current voltage sensed by the voltage sensor 45 is input to the subtractor 131. The subtractor 131 calculates the difference between the estimated value and the sensed value by subtracting the sensed value from the estimated value of the direct current voltage, and inputs the calculated difference to the level sense circuit 132.

The difference of the direct current voltage is input to the level sense circuit 132; and the threshold for sensing the abnormality of the direct current voltage is input to the level sense circuit 132. The level sense circuit 132 senses whether or not the difference of the direct current voltage is the threshold or more. In other words, the level sense circuit 132 senses whether or not the sensed value of the direct current voltage is lower than the estimated value by the threshold or more. Then, the level sense circuit 132 inputs the sensing result to the timer 133.

In the case where it is sensed that the difference of the direct current voltage is the threshold or more, the timer 133 measures a prescribed amount of time. Also, then, in the case where the state in which the estimated value is the threshold or more has continued for the prescribed amount of time, the timer 133 outputs the abnormality detection signal illustrating the abnormality of the direct current voltage.

In the case where the abnormality detection signal is output from the timer 133, the control circuit 14 performs the protection operation for protecting the switch portions 31 and 32. For example, the control circuit 14 performs the transition to the GB state of the switch portions 31 and 32 as the protection operation. The protection operation may be, for example, the suppression of the output by setting the control angle α to the 180° vicinity.

In the open-line test, in the case of an abnormality such as an insulation defect, etc., in the direct current circuit 4, the direct current circuit 4 is shorted; and the direct current voltage decreases. In the embodiment, the control circuit 14 performs the protection operation in the case where the state is continued in which the sensed value of the direct current voltage is smaller, by a prescribed value or more, than the estimated value of the direct current voltage estimated from the alternating current voltage Vac and the control angle α.

Thereby, the switch portions 31 and 32, etc., can be protected even in the case where an insulation defect, etc., occurs in the direct current circuit 4. For example, in the open-line test, when charging the direct current line capacitance 4c of the direct current circuit 4, the generation of excessive current in the switch portions 31 and 32 and the loss occurring in the snubber circuits can be suppressed.

Eleventh Embodiment

Figure 20:
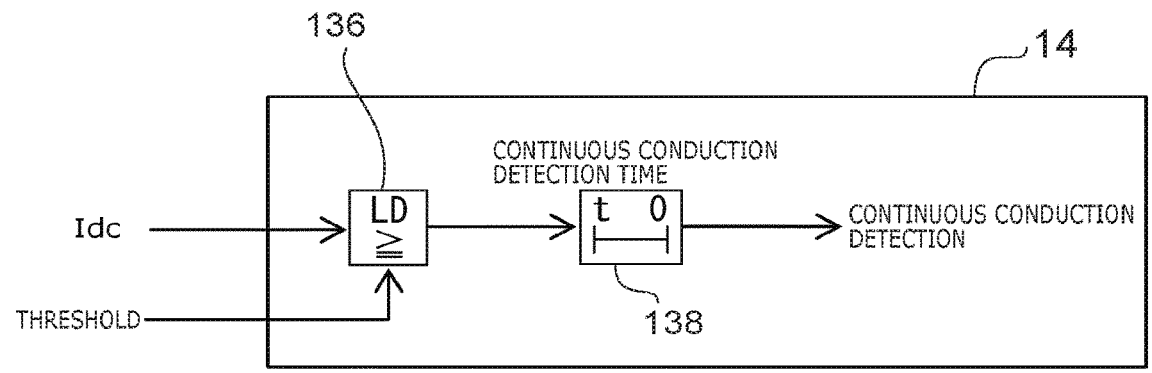
FIG. 20 is a block diagram schematically illustrating a control circuit of an AC-DC conversion device according to an eleventh embodiment.

FIG. 20 is a block diagram schematically illustrating a control circuit of an AC-DC conversion device according to an eleventh embodiment. The circuit illustrated in FIG. 20 may be included as a portion of the protection circuit 245.

In the example as illustrated in FIG. 20, the control circuit 14 includes a level sense circuit 136 and a timer 138. The sensed value of the direct current sensed by the current sensor 44 and the threshold of the direct current are input to the level sense circuit 136. The level sense circuit 136 senses whether or not the sensed value of the direct current is the threshold or more. In other words, the level sense circuit 136 senses whether or not the direct current is flowing. Then, the level sense circuit 136 inputs the sensing result to the timer 138.

In the case where it is sensed that the sensed value of the direct current is the threshold or more, the timer 138 measures a prescribed amount of time. In other words, the timer 138 measures the prescribed amount of time in the case where the direct current is flowing. Then, in the case where the state in which the sensed value of the direct current is the threshold or more has continued for the prescribed amount of time, the timer 138 outputs a continuous conduction detection signal illustrating the sensing of the continuous conduction.

In the case where the continuous conduction detection signal is output from the timer 138, the control circuit 14 performs the protection operation for protecting the switch portions 31 and 32. For example, the control circuit 14 performs the transition to the GB state and/or the output suppression as the protection operation.

As described in the first to fifth embodiments recited above, by reducing the control angle α relatively more slowly than the charge rate of the direct current voltage, the converters 21 and 22 are set to the discontinuous conduction state; and the charging current is small. For example, in the case where there is an abnormality such as an insulation defect, etc., in the direct current circuit 4, there is a possibility that the direct current circuit 4 may be shorted; the direct current may become large; and the converters 21 and 22 may operate in a continuous conduction state (the 120° conduction state). The direct current is intermittent in the discontinuous conduction state. In other words, the direct current is discontinuous. On the other hand, in the continuous conduction state, the direct current flows continuously in the direct current circuit 4.

Accordingly, in the embodiment, the continuous conduction state is sensed by monitoring that the direct current is flowing continuously. Then, the protection operation is performed according to the sensing of the continuous conduction state. Thereby, the switch portions 31 and 32, etc., can be protected in the case where there is an abnormality in the direct current circuit 4, etc. For example, in the open-line test, the generation of excessive current in the switch portions 31 and 32 and the loss occurring in the snubber circuits can be suppressed when charging the direct current line capacitance 4c of the direct current circuit 4.

Figure 21:
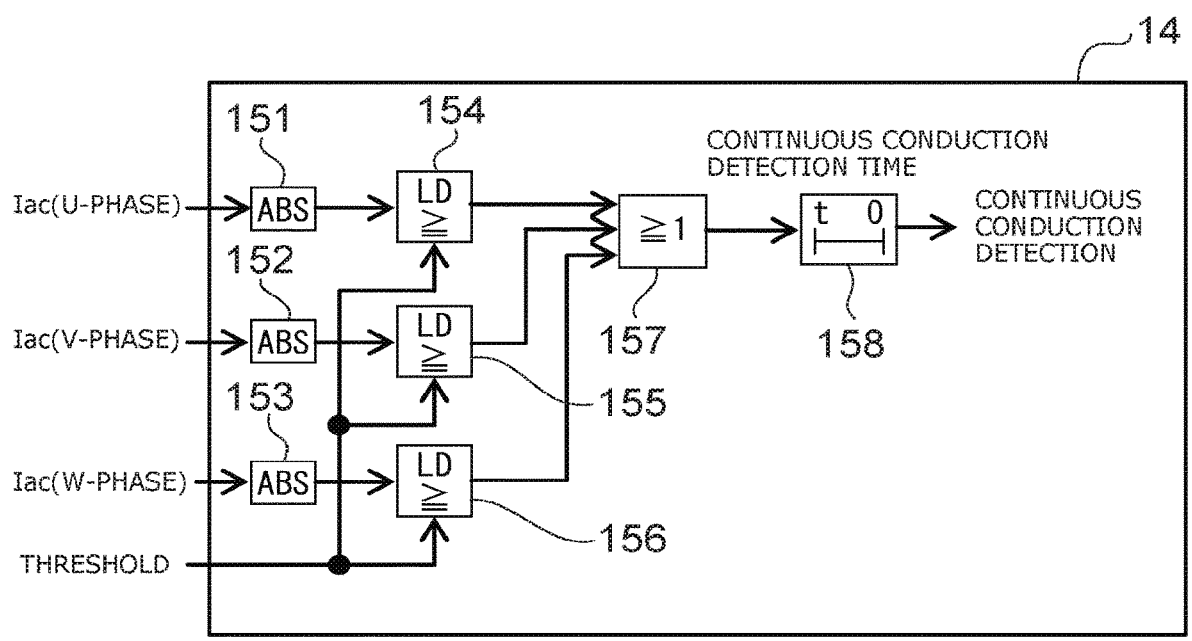
FIG. 21 is a block diagram schematically illustrating another control circuit of the AC-DC conversion device according to the eleventh embodiment.

FIG. 21 is a block diagram schematically illustrating another control circuit of the AC-DC conversion device according to the eleventh embodiment. The circuit illustrated in FIG. 21 may be included as a portion of the protection circuit 245.

In the example as illustrated in FIG. 21, the control circuit 14 includes absolute value circuits 151 to 153, level sense circuits 154 to 156, an OR circuit 157, and a timer 158.

The sensed value of the alternating current sensed by the current sensor 40a or the current sensor 41a is input to the absolute value circuit 151. The sensed value of the alternating current sensed by the current sensor 40b or the current sensor 41b is input to the absolute value circuit 152. The sensed value of the alternating current sensed by the current sensor 40c or the current sensor 41c is input to the absolute value circuit 153. Each absolute value circuit 151 inputs the absolute value of the input alternating current to the level sense circuit 154. Each absolute value circuit 152 inputs the absolute value of the input alternating current to the level sense circuit 155. Each absolute value circuit 153 inputs the absolute value of the input alternating current to the level sense circuit 156.

The absolute value of the alternating current of each phase is input to each of the level sense circuits 154 to 156; and the threshold for sensing the conduction of each phase is input to each of the level sense circuits 154 to 156. The level sense circuits 154 to 156 each sense whether or not the absolute value of the alternating current is the threshold or more and input the sensing result to the OR circuit 157. For example, in the case where the absolute value of the alternating current is less than the threshold, the level sense circuits 154 to 156 each output Low; and in the case where the absolute value of the alternating current is the threshold or more, the level sense circuits 154 to 156 each output High.

When all of the outputs of the level sense circuits 154 to 156 are Low, the OR circuit 157 inputs Low to the timer 158; otherwise, the OR circuit 157 inputs High to the timer 158.

In the discontinuous conduction state, an interval exists in which a current does not flow in any phase of the three phases of the alternating current. On the other hand, in the continuous conduction state, currents flow continuously in two phases. The state in which the output of the OR circuit 157 is Low is a state in which a current does not flow in any of the phases. The state in which the output of the OR circuit 157 is High is a state in which the current flows in one of the phases. Accordingly, in the case where the output of the OR circuit 157 is Low, it can be considered that the converters 21 and 22 operate in the discontinuous conduction state. Also, in the case where the state in which the output of the OR circuit 157 is High has continued for the prescribed amount of time, it can be considered that the converters 21 and 22 are operating in the continuous conduction state.

In the case where it is sensed that the output of the OR circuit 157 is High, the timer 158 measures a prescribed amount of time. Then, in the case where the state in which the output of the OR circuit 157 is High has continued for the prescribed amount of time, the timer 158 outputs the continuous conduction detection signal indicating the sensing of the continuous conduction. The control circuit 14 performs the protection operation according to the output of the continuous conduction detection signal.

Thus, in the example, the interval in which an alternating current does not flow in any phase is monitored; and in the case where the interval in which the alternating current is flowing has continued for the prescribed amount of time, the state is determined to be the continuous conduction state.

Thus, the continuous conduction state may be sensed from the sensed value of the alternating current of each phase.

Figure 22:
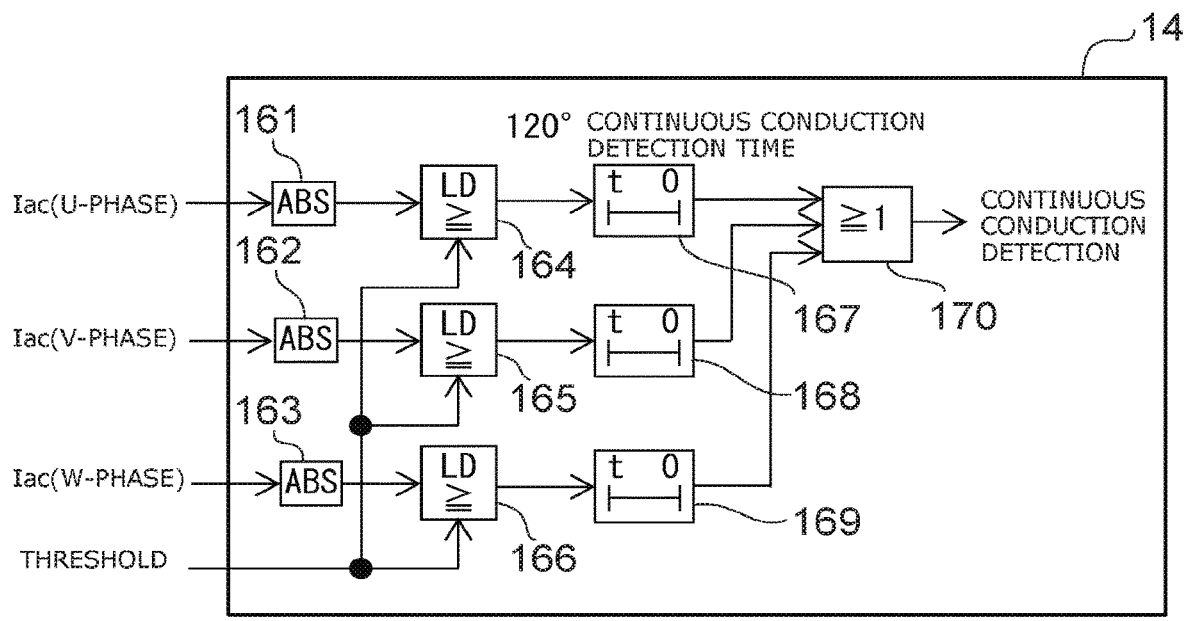
FIG. 22 is a block diagram schematically illustrating another control circuit of the AC-DC conversion device according to the eleventh embodiment.

FIG. 22 is a block diagram schematically illustrating another control circuit of the AC-DC conversion device according to the eleventh embodiment. The circuit illustrated in FIG. 22 may be included as a portion of the protection circuit 245.

In the example as illustrated in FIG. 22, the control circuit 14 includes absolute value circuits 161 to 163, level sense circuits 164 to 166, timers 167 to 169, and an OR circuit 170.

The operations of the absolute value circuits 161 to 163 and the level sense circuits 164 to 166 are similar to those recited above; and a detailed description is therefore omitted. In other words, the absolute value circuits 161 to 163 and the level sense circuits 164 to 166 sense the conduction of each phase of the alternating current. The level sense circuits 164 to 166 sense whether or not the absolute value of the alternating current is the threshold or more and input the sensing result to each of the timers 167 to 169.

The timers 167 to 169 sense the conduction time of each phase of the alternating current based on the sensing results of the level sense circuits 164 to 166 and input the sensing results to the OR circuit 170. In other words, the timers 167 to 169 sense the conduction width of each phase of the alternating current. For example, in the case where the conduction time is less than the threshold, the timers 167 to 169 each output Low to the OR circuit 170; and in the case where the conduction time is the threshold or more, the timers 167 to 169 each output High to the OR circuit 170.

In the continuous conduction state, the conduction width of the alternating current of each phase is 120° or more. Accordingly, the conduction width of the alternating current of each phase is monitored; and it is determined whether or not the conduction width exceeds the threshold (e.g., 110°). In the case where the conduction width exceeds the threshold, it can be considered that the converters 21 and 22 are operating in the continuous conduction state.

The OR circuit 170 performs the sensing of the continuous conduction state based on the outputs of the timers 167 to 169. For example, in the case where the output of one or more of the timers 167 to 169 is High, the OR circuit 170 senses the continuous conduction state. In other words, the OR circuit 170 senses the continuous conduction state in the case where the conduction width of any one of the alternating current of each of the phases is the threshold or more.

The OR circuit 170 outputs the continuous conduction detection signal indicating the sensing of the continuous conduction according to the sensing of the continuous conduction state. The control circuit 14 performs the protection operation according to the output of the continuous conduction detection signal. Thus, the continuous conduction state may be sensed from the conduction width of the alternating current of each phase.

Twelfth Embodiment

Figure 23:
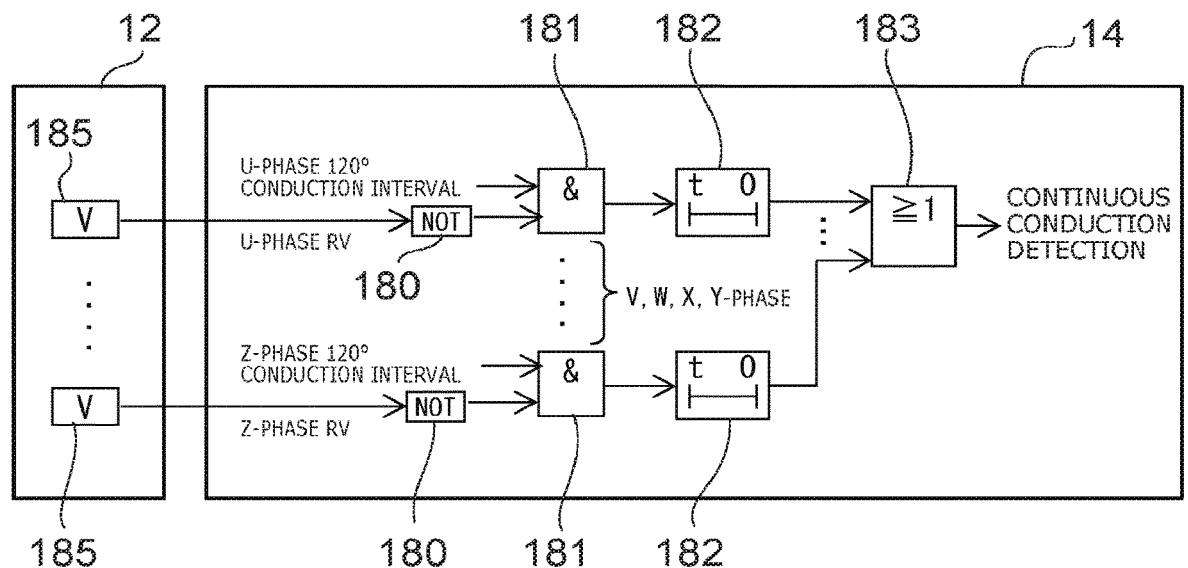
FIG. 23 is a block diagram schematically illustrating a control circuit of an AC-DC conversion device according to a twelfth embodiment.

FIG. 23 is a block diagram schematically illustrating a control circuit of an AC-DC conversion device according to a twelfth embodiment. The circuit illustrated in FIG. 23 may be included as a portion of the protection circuit 245.

In the example as illustrated in FIG. 23, the control circuit 14 includes multiple NOT gates 180, multiple AND circuits 181, multiple timers 182, and an OR circuit 183. The NOT gates 180, the AND circuits 181, and the timers 182 are provided respectively for the switch portions 31 and 32.

Also, in the example, multiple voltage sensors 185 are provided in the major circuit portion 12. The voltage sensors 185 are provided respectively for the switch portions 31 and 32. In the case where a reverse voltage is applied between A-K of the switch portions 31 and 32, the voltage sensors 185 sense a reverse voltage RV and input the sensing result to the NOT gates 180 of the control circuit 14. For example, each of the voltage sensors 185 outputs High when the reverse voltage RV is sensed, and outputs Low when the reverse voltage RV is not sensed.

The sensing results of the reverse voltage RV of the voltage sensors 185 are input respectively to the NOT gates 180. The NOT gates 180 reverse the outputs of the voltage sensors 185 and input the reversed outputs to the AND circuits 181.

The outputs from the NOT gates 180 are input to the AND circuits 181; and the conduction interval signals illustrating the 120° conduction intervals of the switch portions 31 and 32 are input to the AND circuits 181. The 120° conduction interval is the interval from the transmission of the ON command to the switch portion until the ON command is transmitted to the next switch portion. The conduction interval signal is High in the 120° conduction interval of the switch portion, and is Low in the other intervals. The AND circuits 181 input the ANDs of the conduction interval signals and the outputs of the NOT gates 180 to the timers 182. In other words, in the 120° conduction intervals of the switch portions, the reverse voltage RV is not sensed; and the AND circuits 181 output High.

The timers 182 measure a prescribed amount of time in the case where High is output from the AND circuits 181. Then, in the case where the state in which High is output from the AND circuits 181 has continued for the prescribed amount of time, the timers 182 output High to the OR circuit 183.

The OR circuit 183 senses the continuous conduction state based on the outputs of the timers 182. For example, the OR circuit 183 senses the continuous conduction state in the case where High is output from one or more of the timers 182. In other words, the OR circuit 183 senses the continuous conduction state in the case where the sensing interval of the reverse voltage RV in the 120° conduction interval of any of the switch portions 31 and 32 is shorter than the intervals set by the timers 182.

The OR circuit 183 outputs the continuous conduction detection signal indicating the sensing of the continuous conduction according to the sensing of the continuous conduction state. The control circuit 14 performs the protection operation according to the output of the continuous conduction detection signal. Thus, the continuous conduction state may be sensed based on the reverse voltage in the 120° conduction interval.

The protection methods recited above are arbitrarily combinable. For example, in the case where the estimated value of the A-K voltage estimation circuit 120 exceeds the threshold, the protection operation may be performed according to sensing one of the case where the sensed value of the direct current voltage is smaller than the estimated value of the direct current voltage by a prescribed value or more, or the case where the continuous conduction state is sensed.

Thirteenth Embodiment

Figure 24:
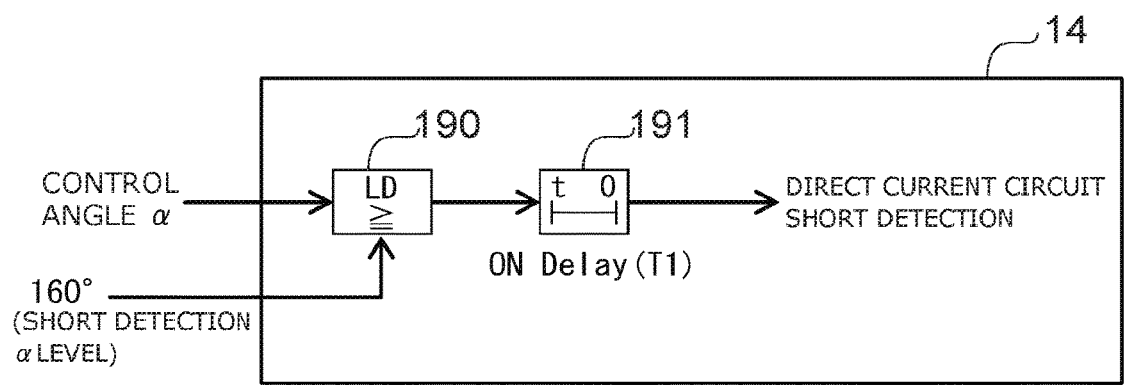
FIG. 24 is a block diagram schematically illustrating a control circuit of an AC-DC conversion device according to a thirteenth embodiment.

FIG. 24 is a block diagram schematically illustrating a control circuit of an AC-DC conversion device according to a thirteenth embodiment.

Figure 25:
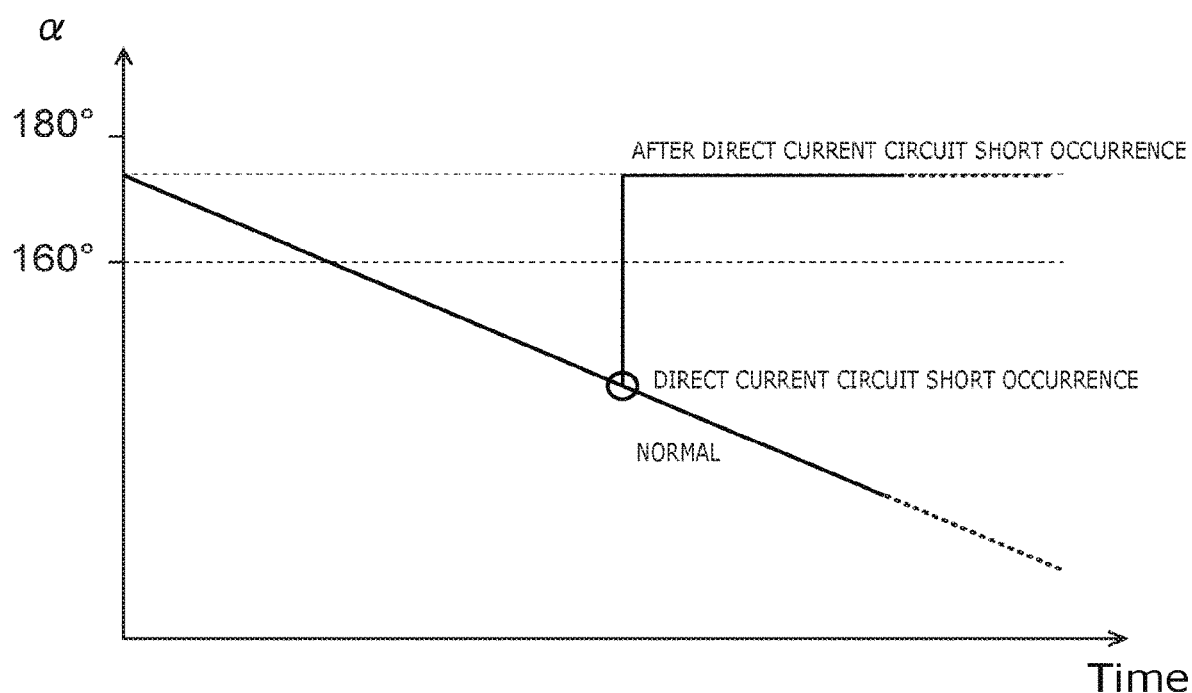
FIG. 25 is a graph schematically illustrating the behavior of the control angle α normally and when the direct current circuit is shorted.

FIG. 25 is a graph schematically illustrating the behavior of the control angle α normally and when the direct current circuit is shorted.

In the example as illustrated in FIG. 24, the control circuit 14 includes a level sense circuit 190 and a timer 191.

The control angle α and the abnormality detection level of the control angle α are input to the level sense circuit 190. The level sense circuit 190 senses whether or not the control angle α is the abnormality detection level or more and inputs the sensing result to the timer 191. In the example, 160° is set as the abnormality detection level of the control angle α. The abnormality detection level of the control angle α may be any value near 180°.

The timer 191 measures the prescribed amount of time in the case where it is sensed that the control angle α is the abnormality detection level or more. Then, in the case where the state in which the control angle α is the abnormality detection level or more has continued for the prescribed amount of time, the timer 191 outputs the direct current circuit short detection signal indicating the short of the direct current circuit 4.

In the case where the direct current circuit short detection signal is output from the timer 191, the control circuit 14 performs the protection operation for protecting the switch portions 31 and 32. For example, the control circuit 14 performs the transition to the GB state and/or the output suppression as the protection operation.

As in the fourth and fifth embodiments, in the case where a short occurs in the direct current circuit 4 in the state in which a control is performed to gradually reduce the control angle α according to the magnitude of the direct current voltage, the direct current voltage decreases due to the short (to be substantially 0 V). Therefore, as illustrated in FIG. 25, the operation continues in the state in which the control angle α is no longer advanced from the 180° vicinity.

Accordingly, in the embodiment, the short of the direct current circuit 4 is sensed in the case where the control angle α does not advance past an abnormality detection level for a constant interval. Then, the protection operation is performed according to the sensing of the short of the direct current circuit 4. The time of the timing by the timer 191 is set to a length at which the abnormality is not sensed in the normal state by considering the rate at which the control angle α advances when the operation is performed in the normal state in which a short has not occurred in the direct current circuit 4. Thereby, even in the case where a short occurs in the direct current circuit 4, the switch portions 31 and 32, etc., can be protected. For example, the generation of excessive current of the switch portions 31 and 32 and/or the loss occurring in the snubber circuits can be suppressed even in the case where a short occurs in the direct current circuit 4 for the condition of the direct current voltage of the direct current circuit 4 not increasing sufficiently in the open-line test and the abnormality of the circuit not being able to be sensed from the voltage sensed value and/or the current sensed value.

Fourteenth Embodiment

Figure 26:
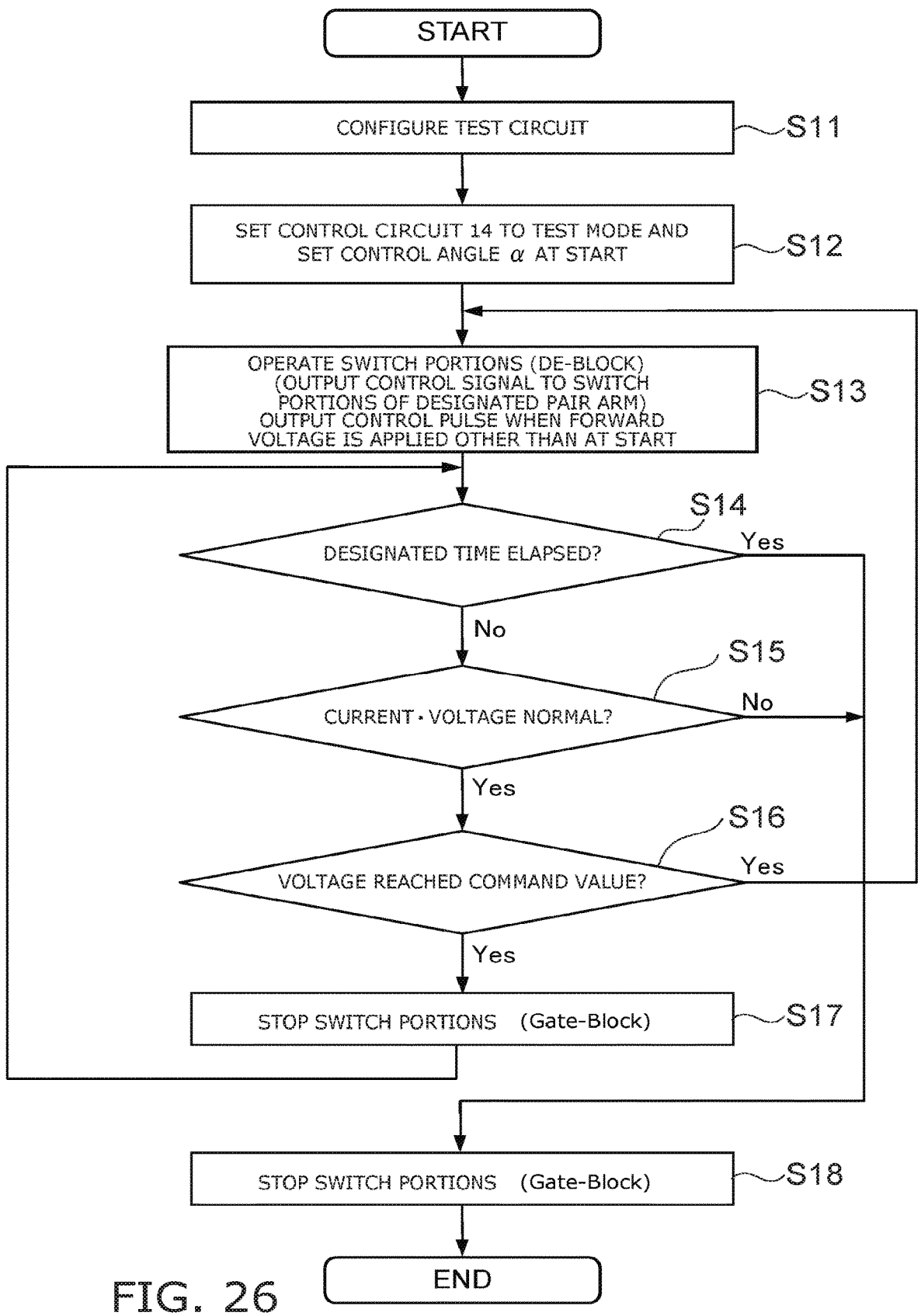
FIG. 26 is a flowchart schematically illustrating an example of operations of an AC-DC conversion device according to a fourteenth embodiment.

FIG. 26 is a flowchart schematically illustrating an example of operations of an AC-DC conversion device according to a fourteenth embodiment.

In the example as illustrated in FIG. 26, the control circuit 14 configures the test circuit similarly to the description relating to FIG. 6 (step 11 of FIG. 26), subsequently sets the open-line test mode, and further sets the control angle α when starting (step S12 of FIG. 26). Here, α is set to a value at which the major circuit can withstand the stress due to the inrush current in the startup.

The control circuit 14 operates the switch portions by outputting, as the control pulses to the switch portions 31 and 32, a BPP gate signal for operating the converters 21 and 22 as a bypass pair (hereinbelow, called the BPP) (step S13 of FIG. 26). The BPP is the operation method of outputting the control pulses (the trigger pulses) to the switch portions (the thyristor valves) of the phases forming the pair arms of the switch portions 31 and 32. In the example, for example, this is an operation method of setting the pair arm of the switch portions (31u and 31x) and the pair arm of (32u and 32x) to be the phases operated as the bypass pair, and outputting the control pulse to the switch portion for which a forward voltage is sensed when sensing that the forward voltage is applied between A-K for one of the switch portions 31u, 31x, 32u, and 32x. Also, in the BPP state, the control pulse is not output to the other switch portions (in the example, 31v, 31w, 31y, 31z, 32v, 32w, 32y, and 32z). The combination of the switch portions set to the BPP state may be, for example, the switch portions 31u, 31x, 32v, and 32y or may be the switch portions 31v, 31y, 32w, and 32z.

In the circuit configuration of the open-line test, when the control pulse is applied to the switch portion of the designated pair arm of the switch portions 31 and 32, the current is not continued; the conducting state of each of the phases also is not continued; therefore, the operation is an operation in which ON-OFF is repeated periodically for the switch portions 31 and 32 of the designated pair arm. Each time the forward voltage is applied between A-K for the switch portions 31 and 32 of the designated pair arm, the control pulse is input to the switch portion for which the forward voltage is applied between A-K; and the switch portion to which the control pulse is input is triggered (ON). When implementing such a BPP operation, it is unnecessary for the control circuit to control the control angle α; and it is sufficient to output the control pulse each time the forward voltage is applied between A-K of the switch portions 31 and 32 of the designated pair arm. At this time, the direct current voltage is charged by the charging current flowing from the alternating current system via the switch portions 31 and 32 that are ON. By this method, the load on the snubber circuits is reduced without performing a commutation operation of the switch portions 31 and 32 and without the A-K voltage becoming high when triggered (ON). Accordingly, when charging the direct current line capacitance 4c of the direct current circuit 4 in the open-line test, the generation of excessive current of the switch portions 31 and 32 and/or the loss occurring in the snubber circuits can be suppressed.

The control circuit 14 determines whether or not the prescribed amount of time has elapsed for the operation time; and in the case where the prescribed amount of time has elapsed, the flow transitions to stopping the switch portions in step S18 (step S14 of FIG. 26). After starting the operations of the switch portions 31 and 32, the control circuit 14 determines whether or not the alternating current, the alternating current voltage, the direct current, and the direct current voltage are normal based on the sensed values of the current sensors 40a, 40b, 40c, 41a, 41b, and 41c, the voltage sensors 46a, 46b, and 46c, the current sensor 44, and the voltage sensor 45 (step S15 of FIG. 26).

In the case of the abnormal determination, the control circuit 14 stops the operations of the switch portions 31 and 32 and halts the open-line test.

On the other hand, in the case of the normal determination, the control circuit 14 determines whether or not the direct current voltage has reached the command value based on the sensed value of the voltage sensor 45 (step S16 of FIG. 26).

In the case where it is determined that the direct current voltage has not reached the command value, the control circuit 14 returns to step S13, inputs the control pulses to the switch portions 31 and 32 of the designated pair arm that are set, and operates the switch portions 31 and 32. By repeating step S13 to step S16, the control circuit 14 gradually increases the direct current voltage applied to the direct current circuit 4 from the converters 21 and 22. Thereafter, the control circuit 14 repeats the processing of step S13 to step S16 until the direct current voltage reaches the command value.

For example, as in the seventh embodiment, when it is sensed that the direct current voltage has reached the command value, the control circuit 14 stops the switch portions 31 and 32 (GB: Gate-Block) (step S17 of FIG. 26); and in the case where the direct current voltage again falls below the command value, the control circuit 14 returns to step 13 and operates the switch portions 31 and 32. The control circuit 14 repeats the operating and the stopping of the switch portions 31 and 32, holds the direct current voltage, and in the case where the prescribed amount of time has continued, determines the breakdown voltage and the like of the direct current circuit 4 to be normal, stops the operations of the switch portions 31 and 32, and ends the open-line test (step S18 of FIG. 26).

Thus, a control may be performed to match the direct current voltage to the command value by sensing whether or not the direct current voltage has reached the command value and by performing de-block/block of the control pulses to the designated pair arm.

According to the embodiments, an AC-DC conversion device and a method for controlling the AC-DC conversion device are provided in which the generation of excessive current of the switch portions 31 and 32 and/or the loss occurring in the snubber circuits can be suppressed when charging the direct current line capacitance 4c of the direct current circuit 4 in an open-line test.

Hereinabove, embodiments of the invention are described with reference to specific examples. However, the embodiments of the invention are not limited to these specific examples. For example, one skilled in the art may similarly practice the invention by appropriately selecting specific configurations of components included in the AC-DC conversion device such as the major circuit portion, the control circuit, the switching element, the snubber circuit, the switch portion, the converter, the voltage estimation circuit, the current sensor, the voltage sensor, the direct current voltage estimation circuit, etc., from known art; and such practice is within the scope of the invention to the extent that similar effects can be obtained.

Also, any two or more components of the specific examples may be combined within the extent of technical feasibility and are within the scope of the invention to the extent that the spirit of the invention is included.

Further, all AC-DC conversion devices and methods for controlling AC-DC conversion devices practicable by an appropriate design modification by one skilled in the art based on the AC-DC conversion devices and the methods for controlling the AC-DC conversion devices described above as embodiments of the invention also are within the scope of the invention to the extent that the spirit of the invention is included.

Further, various modifications and alterations within the spirit of the invention will be readily apparent to those skilled in the art; and all such modifications and alterations should be seen as being within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

The invention claimed is:

1. An AC-DC conversion device, comprising:
   a major circuit portion including a converter and being connected to an alternating current power supply and a direct current circuit, the converter including a plurality of switch portions having a bridge connection, each of the plurality of switch portions including a switching element and a snubber circuit, the switching element being separately-excited, the snubber circuit being connected in parallel with the switching element, the major circuit portion applying an alternating current voltage to the direct current circuit by an ON of the plurality of switch portions, the alternating current voltage being applied from the alternating current power supply; and
   a control circuit controlling a voltage applied from the converter to the direct current circuit by switching an ON timing of the plurality of switch portions by inputting a control pulse to each of the plurality of switch portions,
   the major circuit portion including a first voltage sensor and a second voltage sensor, the first voltage sensor being configured to sense the direct current voltage output from the converter and input a sensed values of the direct current voltage to the control circuit, the second voltage sensor being configured to sense the alternating current voltage of the alternating current power supply and input a sensed values of the alternating current voltage to the control circuit,
   the control circuit reducing a control angle of the control pulse input to each of the plurality of switch portions in a range between 90° and 180° when charging a capacitance component included in the direct current circuit to a voltage command value,
   a command value of a voltage applied to two ends of one of the plurality of switch portions to be triggered when triggering the plurality of switch portions being input to the control circuit, and
   the control circuit calculating the control angle according to the command value of the voltage applied to the plurality of switch portions when triggering, the control circuit being configured to calculate the control angle by Formula 1 or Formula 2 based on the sensed value of the alternating current voltage, the sensed value of the direct current voltage, and the command value, $$\alpha = \sin^{-1}\left[\frac{(V_{AK\_ref}/k) + (V_{dc}/4)}{V_{acpeak} \times N}\right] \quad \text{[Formula 1]}$$

$$\alpha = \cos^{-1}\left[-\sqrt{1 - \left\{\frac{(V_{AK\_ref}/k) + (V_{dc}/4)}{V_{acpeak} \times N}\right\}^2}\right] \quad \text{[Formula 2]}$$

where

α is the control angle, $V_{AK\_ref}$ is the command value, k is a constant, $V_{dc}$ is the direct current voltage sensed by the first voltage sensor, $V_{acpeak}$ is the peak value of the alternating current voltage sensed by the second voltage sensor, and N is the transformation ratio.

2. The AC-DC conversion device according to claim 1, wherein the control circuit reduces the control angle to cause an increase rate of the voltage applied to the direct current circuit by the converter to be faster than an increase rate of a direct current voltage of the capacitance of the direct current circuit.

3. The AC-DC conversion device according to claim 2, wherein the control circuit increases the control angle in the 180° direction at a rate slower than a discharging time constant of the direct current circuit in the case where the direct current voltage is higher than the voltage command value.

4. The AC-DC conversion device according to claim 1, wherein the control circuit includes a voltage estimation circuit estimating a voltage applied to two ends of one of the plurality of switch portions to be triggered when triggering the plurality of switch portions, and the control circuit corrects a rate of the decrease of the control angle based on an estimated value of the voltage estimation circuit to cause the estimated value to be a prescribed value.

5. The AC-DC conversion device according to claim 4, wherein the voltage estimation circuit estimates the voltage from the formula $$VA\text{-}K = k(Vacpeak \times \sin\alpha - (\tfrac{1}{4})Vdc),$$

where VA-K is a voltage applied when triggering the plurality of switch portions, Vacpeak is a peak value of the alternating current voltage of the alternating current power supply, Vdc is a direct current voltage of the capacitance of the direct current circuit, α is the control angle, and k is a prescribed constant.

6. The AC-DC conversion device according to claim 1, wherein the major circuit portion further includes a current sensor sensing a direct current output from the converter, and the control circuit corrects a rate of the decrease of the control angle based on a sensed value of the current sensor to cause the direct current to be constant.

7. The AC-DC conversion device according to claim 1, wherein the control circuit performs the input of the control pulse to the plurality of switch portions in the case where a direct current voltage of the capacitance of the direct current circuit is less than a command value, and does not perform the input of the control pulse to the plurality of switch portions in the case where the direct current voltage of the capacitance of the direct current circuit is not less than the command value.

8. The AC-DC conversion device according to claim 7, wherein the control circuit performs, each time a prescribed interval elapses, a determination of whether or not the direct current voltage of the capacitance of the direct current circuit is not less than the command value.

9. The AC-DC conversion device according to claim 1, wherein the control circuit inputs the control pulse to only a designated phase for the plurality of switch portions.

10. The AC-DC conversion device according to claim 1, wherein the control circuit includes a voltage estimation circuit estimating a voltage applied to two ends of one of the plurality of switch portions to be triggered when triggering the plurality of switch portions, and the control circuit performs a protection operation for protecting the plurality of switch portions in the case where an estimated value of the voltage estimation circuit exceeds a threshold.

11. The AC-DC conversion device according to claim 1, wherein the major circuit portion further includes a voltage sensor sensing a direct current voltage of the capacitance of the direct current circuit, and a voltage sensor sensing the alternating current voltage of the alternating current power supply, and the control circuit includes a direct current voltage estimation circuit estimating the direct current voltage of the capacitance of the direct current circuit from the control angle and the alternating current voltage of the alternating current power supply, and the control circuit performs a protection operation for protecting the plurality of switch portions in the case where a sensed value of the direct current voltage is smaller, by a prescribed value or more, than an estimated value estimated by the direct current voltage estimation circuit.

12. The AC-DC conversion device according to claim 1, wherein the major circuit portion further includes a current sensor sensing a direct current output from the converter, and the control circuit performs a protection operation for protecting the plurality of switch portions in the case where the direct current is flowing continuously.

13. The AC-DC conversion device according to claim 1, wherein the major circuit portion further includes a current sensor sensing an alternating current of the alternating current power supply, and the control circuit performs a protection operation for protecting the plurality of switch portions in the case where an interval in which the alternating current is flowing has continued a prescribed amount of time.

14. The AC-DC conversion device according to claim 1, wherein the major circuit portion further includes a current sensor sensing an alternating current of the alternating current power supply, and the control circuit senses a conduction width of the alternating current based on a sensed value of the current sensor, and performs a protection operation for protecting the plurality of switch portions in the case where the conduction width is a threshold or more.

15. The AC-DC conversion device according to claim 1, wherein the major circuit portion includes a plurality of voltage sensors sensing voltages applied respectively to the plurality of switch portions, and the control circuit senses an application of a reverse voltage to the plurality of switch portions based on a signal from the plurality of voltage sensors, and performs a protection operation for protecting the plurality of switch portions in the case where the reverse voltage is not sensed in a 120° conduction interval of one of the plurality of switch portions.

16. The AC-DC conversion device according to claim 1, wherein the control circuit performs a protection operation for protecting the plurality of switch portions in the case where the control angle does not advance past an abnormality detection level for a constant interval.

17. A method for controlling an AC-DC conversion device, the AC-DC conversion device including a major circuit portion including a converter and being connected to an alternating current power supply and a direct current circuit, the converter including a plurality of switch portions having a bridge connection, each of the plurality of switch portions including a switching element and a snubber circuit, the switching element being separately-excited, the snubber circuit being connected in parallel with the switching element, the major circuit portion applying an alternating current voltage to the direct current circuit by the plurality of switch portions, the alternating current voltage being applied from the alternating current power supply, the major circuit portion including a first voltage sensor and a second voltage sensor, the first voltage sensor being configured to sense the direct current voltage output from the converter, the second voltage sensor being configured to sense the alternating current voltage of the alternating current power supply, method comprising:

controlling a voltage applied from the converter to the direct current circuit by switching an ON timing of the plurality of switch portions by inputting a control pulse to each of the plurality of switch portions;

receiving a command value of a voltage applied to two ends of one of the plurality of switch portions to be triggered when triggering the plurality of switch portions, calculating a control angle of the control pulse by Formula 1 or Formula 2 based on a sensed value of the alternating current voltage, a sensed value of the direct current voltage, and the command value, and reducing the control angle of the control pulse input to each of the plurality of switch portions in a range between 90° and 180° when charging a capacitance component included in the direct current circuit to a command value, $$\alpha = \sin^{-1}\left[\frac{(V_{AK\_ref}/k) + (V_{dc}/4)}{V_{acpeak} \times N}\right] \quad \text{[Formula 1]}$$

$$\alpha = \cos^{-1}\left[-\sqrt{1 - \left\{\frac{(V_{AK\_ref}/k) + (V_{dc}/4)}{V_{acpeak} \times N}\right\}^2}\right] \quad \text{[Formula 2]}$$

where
$\alpha$ is the control angle,
$V_{AK\_ref}$ is the command value,
k is a constant,
$V_{dc}$ is the direct current voltage sensed by the first voltage sensor,
$V_{acpeak}$ is the peak value of the alternating current voltage sensed by the second voltage sensor, and
N is the transformation ratio.

* * * * *